(12) United States Patent
Sullivan et al.

(10) Patent No.: US 11,540,546 B2
(45) Date of Patent: Jan. 3, 2023

(54) NUTRACEUTICALS FOR THE MANAGEMENT OF CONDITIONS RELATED TO TYPE 2 DIABETES

(71) Applicant: Quintessence Nutraceuticals, LLC, Indianapolis, IN (US)

(72) Inventors: Glenn H. Sullivan, Carmel, IN (US); Guillermo E. Sanchez, Guatemala (GT)

(*) Notice: Subject to any disclaimer, the term of this patent is extended or adjusted under 35 U.S.C. 154(b) by 0 days.

(21) Appl. No.: 16/573,561

(22) Filed: Sep. 17, 2019

(65) Prior Publication Data

US 2020/0253259 A1   Aug. 13, 2020

Related U.S. Application Data

(63) Continuation-in-part of application No. 14/923,666, filed on Oct. 27, 2015, which is a continuation of application No. 13/494,998, filed on Jun. 13, 2012, now Pat. No. 9,192,180, which is a continuation-in-part of application No. 12/882,202, filed on Sep. 15, 2010, now Pat. No. 8,945,642.

(51) Int. Cl.
| | |
|---|---|
| *A23L 33/15* | (2016.01) |
| *A23L 33/16* | (2016.01) |
| *A23L 33/155* | (2016.01) |
| *A23L 7/10* | (2016.01) |
| *A23D 9/00* | (2006.01) |
| *A23L 33/105* | (2016.01) |

(52) U.S. Cl.
CPC ............... *A23L 33/15* (2016.08); *A23D 9/00* (2013.01); *A23L 7/115* (2016.08); *A23L 33/105* (2016.08); *A23L 33/155* (2016.08); *A23L 33/16* (2016.08); *A23V 2002/00* (2013.01)

(58) Field of Classification Search
CPC ........ A23L 7/115; A23L 33/105; A23L 33/15; A23L 33/155; A23L 33/16; A23D 9/00; A23V 2002/00
USPC ............................................. 426/2
See application file for complete search history.

(56) References Cited

U.S. PATENT DOCUMENTS 6,303,586 B1 * 10/2001 McPeak .................... A61P 3/10
                                                        514/54

OTHER PUBLICATIONS

Qureshi, A. A. et al. J. Nut. Biochem. 13: 175-187 (Year: 2002).*

* cited by examiner

*Primary Examiner* — Hamid R Badr
(74) *Attorney, Agent, or Firm* — McAndrews, Held & Malloy, Ltd.

(57) ABSTRACT

Disclosed are nutraceutical formulations, including extracts comprising the hydrophilic and lipophilic fractions of stabilized rice bran. Also disclosed are methods for using said nutraceutical formulations for the management or remediation of conditions related to type II diabetes in humans, including methods for decreasing HbA1c and fasting glucose blood concentrations, and for increasing serum fasting insulin levels.

1 Claim, 19 Drawing Sheets

NUTRACEUTICALS FOR THE MANAGEMENT OF CONDITIONS RELATED TO TYPE 2 DIABETES

CROSS-REFERENCE TO RELATED APPLICATIONS

This application is a continuation-in-part of U.S. application Ser. No. 14/923,666, filed Oct. 27, 2015, now pending, which is a continuation of U.S. application Ser. No. 13/494,998, filed Jun. 13, 2012, now U.S. Pat. No. 9,192,180, which is a continuation-in-part of U.S. application Ser. No. 12/882,202, filed Sep. 15, 2010, now U.S. Pat. No. 8,945,642. The entire content of each of the applications mentioned in this paragraph are hereby incorporated by reference in their entirety.

FEDERALLY SPONSORED RESEARCH OR DEVELOPMENT

[Not Applicable]

TECHNICAL FIELD

The present invention relates to methods for the remediation of disease using a nutritionally enhanced derivative (isolate) from Stabilized Rice Bran (SRB) with improved yield characteristics.

BACKGROUND

Type II diabetes is a worldwide increasing health concern. According to the World Health Organization, in 2008 the global prevalence was estimated at 4.7% and by 2014 it had increased to 8.5%; some projections estimate a global prevalence between 9.8% and 11% by the year 2030.

There exist a need in the art to provide functional foods which help in the prevention of diabetes. Among other things, the present disclosure provides a nutraceutical formulation that actively participates in the remediation of early type II diabetes.

SUMMARY OF THE INVENTION

Provided are nutraceuticals and their use for the management of health conditions associated with either the development or status of type II diabetes, said health conditions including for example levels of fasting glucose (FG), glycosylated hemoglobin (HbA1c), insulin, high density lipoprotein (HDL), low density lipoprotein (LDL), total cholesterol and triglycerides.

In one aspect, the disclosure provides nutraceuticals, and methods of use, that substantially lower glucose, HbA1c, total cholesterol and LDL in diabetics, and with people showing impaired glucose tolerance, characteristic of a pre-diabetic stage.

In a further aspect, the disclosure provides nutraceuticals, and methods of use that increase insulin production, and reduce glucose levels, in diabetics with higher glucose levels and HbA1c values.

DETAILED DESCRIPTION

Figure 1A:
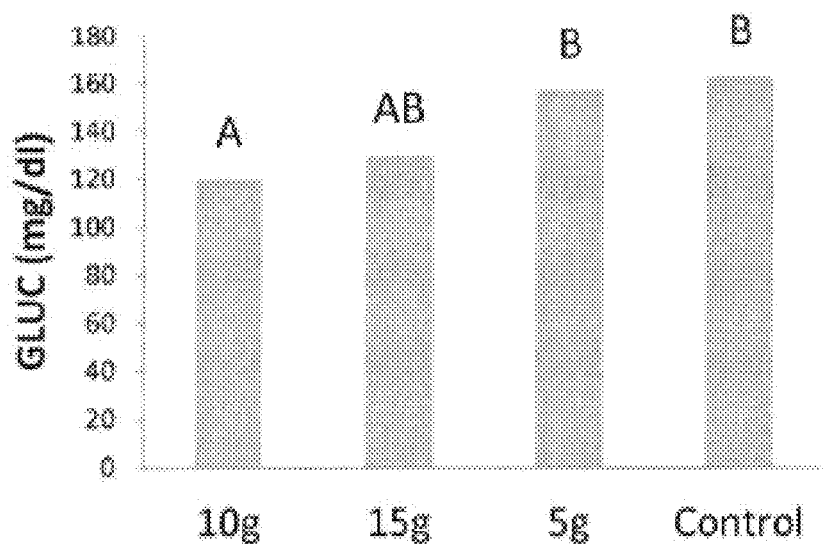
FIGS. 1A-1E. A posteriori mean comparison tests for variables showing statistically significant differences ($p \leq 0.05$) between treatments in the G1 group of participants, according to the Kruskal-Wallis non parametric ANOVA.
Figure 1B:
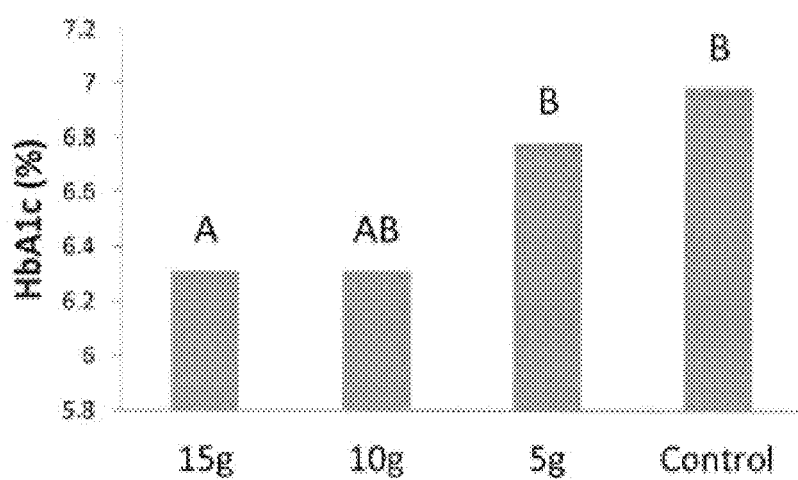
Figure 1C:
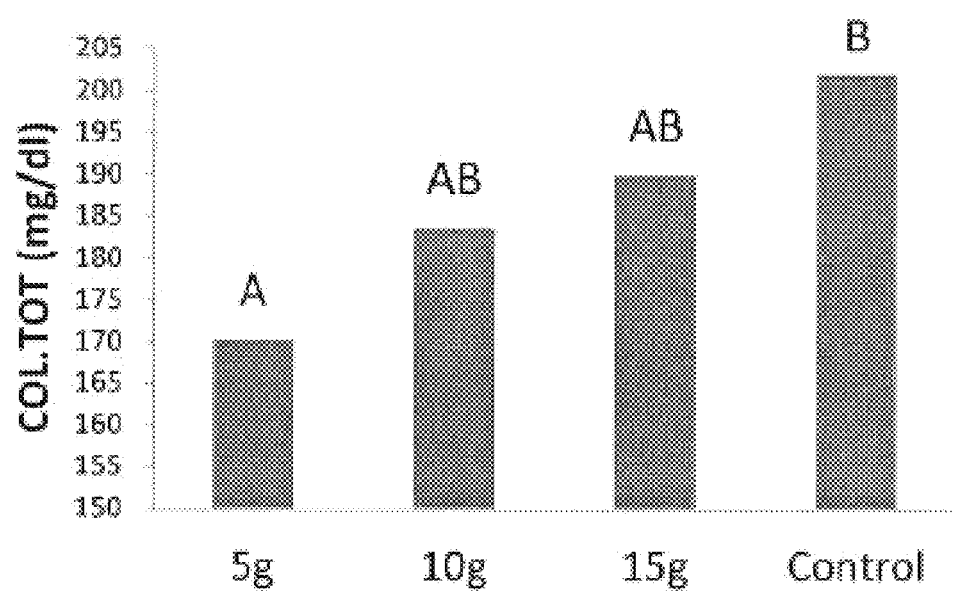
Figure 1D:
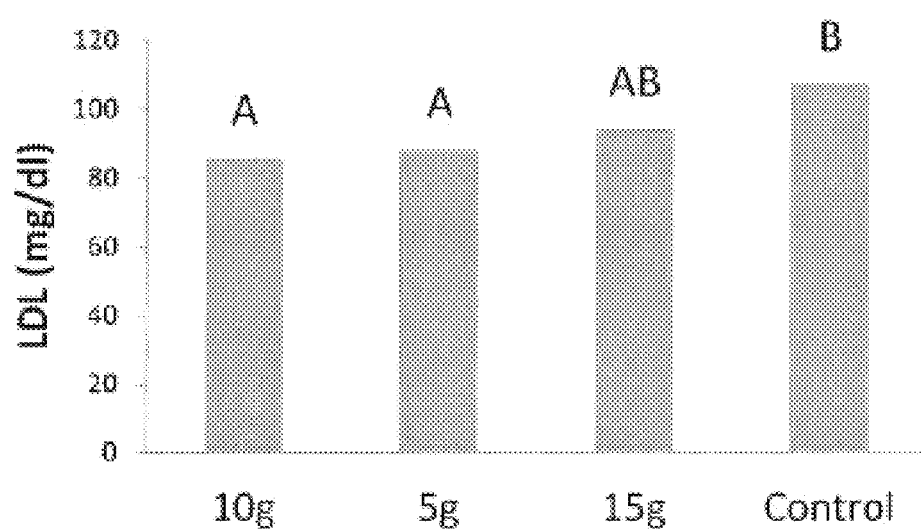
Figure 1E:
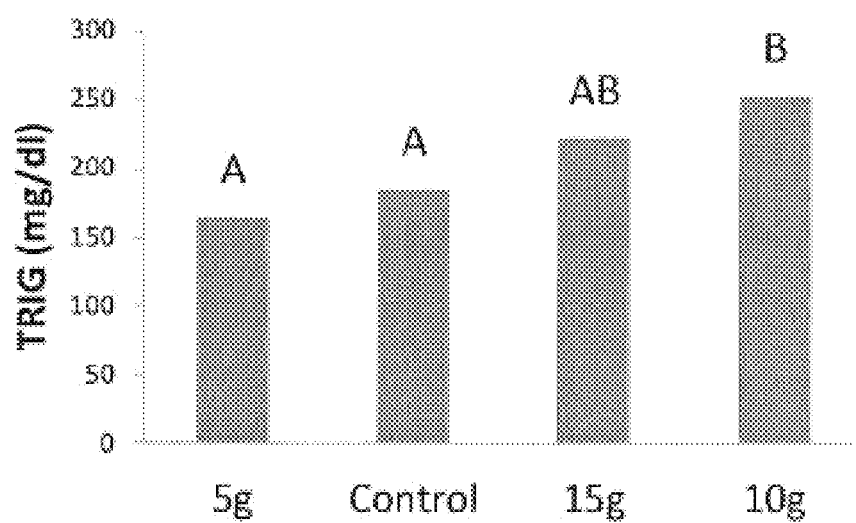

The Examples that follow are intended to be illustrative of the aspects and embodiments described above. Neither the above disclosure nor the Examples below should be viewed as limiting to the scope of the appended claims. One of skill in the art will appreciate that the disclosure is not limited by the particular terminology which is used to describe and illustrate the various aspects of the disclosure.

Presented herein is disclosure showing that nutraceutical formulations, comprising nutraceutical extract from the hydrophilic and lipophilic fractions of stabilized rice bran prepared in accordance with the present disclosure, and related regimens, have a positive impact on the status and progression of type II diabetes.

Disclosed are nutraceutical formulations, including extracts comprising hydrophilic and lipophilic fractions of stabilized rice bran. Also disclosed are methods for using these nutraceutical formulations for the management or remediation of conditions related to type II diabetes in humans.

There are presented herein methods for using nutraceuticals of the present disclosure for decreasing HbA1c blood concentrations, decreasing fasting glucose blood concentrations, and increasing serum fasting insulin levels in type II diabetic and type II pre-diabetic patients.

There are presented nutraceutical formulations herein and methods of using these nutraceutical formulations to decrease fasting glucose (FG) concentrations in the blood of patients having HbA1c of ≥6.1% and <7.5. In certain instances, the decrease in fasting glucose (FG) blood concentrations in the blood of patients having HbA1c of ≥6.1% and <7.5 comprises a 20 to 60 mg/dl drop in fasting glucose (FG) blood concentration, a 25 to 55 mg/dl drop in fasting glucose (FG) blood concentration, a 30 to 50 mg/dl drop in fasting glucose (FG) blood concentration; a 30 to 45 mg/dl drop in fasting glucose (FG) blood concentration, a 30 to 40 mg/dl drop in fasting glucose (FG) blood concentration; 35 to 50 mg/dl drop in fasting glucose (FG) blood concentration, a 35 to 45 mg/dl drop in fasting glucose (FG) blood concentration, or a 35 to 40 mg/dl drop in fasting glucose (FG) blood concentration.

There are also presented nutraceutical formulations herein and methods of using these nutraceutical formulations to decrease HbA1c in the blood of patients having HbA1c of >6.1% and <7.5. In certain instances, the decrease in HbA1c in the blood of patients having HbA1c of >6.1% and <7.5 comprises a decrease of from 0.2% to 2.0%, from 0.5% to 2.0%, from 0.5% to 1.5%, or from 0.5% to 1.0%. This decrease in HbA1c can be concomitant with, or independent of the decrease in fasting glucose (FG) concentrations disclosed above for patients having HbA1c of >6.1% and <7.5.

There are also presented nutraceutical formulations herein and methods of using these nutraceutical formulations to increase fasting serum insulin levels of patients having HbA1c of >6.1% and <7.5. This increase in fasting serum insulin levels in patients having HbA1c of >6.1% and <7.5 results in fasting serum insulin levels of from 8 to 16 uIU/ml, from 9 to 15 uIU/ml, 10 to 14 uIU/ml, from 10 to 13 uIU/ml, from 10 to 12 uIU/ml, or from 11 to 12 uIU/ml. This increase in fasting serum insulin levels is concomitant with or independent of the decrease in fasting glucose (FG) concentrations, and decrease in HbA1c discussed above for patients having HbA1c of >6.1% and <7.5.

There are also presented nutraceutical formulations herein and methods of using these nutraceutical formulations to decrease fasting glucose (FG) concentrations in the blood of patients having HbA1c ≥7.5. In certain instances, the decrease in fasting glucose (FG) blood concentrations in the blood of patients having HbA1c >7.5 comprises a 20 to 60 mg/dl drop in fasting glucose (FG) blood concentration, a 25 to 55 mg/dl drop in fasting glucose (FG) blood concentration, a 30 to 50 mg/dl drop in fasting glucose (FG) blood concentration; a 30 to 45 mg/dl drop in fasting glucose (FG) blood concentration, a 30 to 40 mg/dl drop in fasting glucose (FG) blood concentration; 35 to 50 mg/dl drop in fasting glucose (FG) blood concentration, a 35 to 45 mg/dl drop in fasting glucose (FG) blood concentration, or a 35 to 40 mg/dl drop in fasting glucose (FG) blood concentration.

There are also presented nutraceutical formulations herein and methods of using these nutraceutical formulations to decrease HbA1c in the blood of patients having HbA1c of >7.5. In certain instances, the decrease in HbA1c in the blood of patients having HbA1c of ≥7.5 comprises a decrease of from 0.2% to 2.0%, from 0.2% to 1.0%, from 0.2% to 0.5%, from 0.5% to 2.0%, from 0.5% to 1.5%, or from 0.5% to 1.0%. This decrease in HbA1c can be concomitant with, or independent of the decrease in fasting glucose (FG) concentrations disclosed above for patients having HbA1c of ≥7.5.

There are also presented nutraceutical formulations herein and methods of using these nutraceutical formulations to increase fasting serum insulin levels of patients having HbA1c ≥7.5. This increase in fasting serum insulin levels in patients having HbA1c of ≥7.5 results in fasting serum insulin levels of from 6 to 18 uIU/ml, from 7 to 17 uIU/ml, 8 to 16 uIU/ml, from 10 to 15 uIU/ml, from 10 to 14 uIU/ml, or from 12 to 14 uIU/ml. This increase in fasting serum insulin levels is concomitant with or independent of the decrease in fasting glucose (FG) concentrations, and decrease in HbA1c discussed above for patients having HbA1c ≥7.5.

As discussed in greater detail below one study's design, based on the HbA1c levels, divided participants into two categories: (1) G1, which included participants with slightly elevated HbA1c levels (≤7.49%) and G2, comprised of participants with HbA1c levels above 7.5% (which basically is equivalent to glucose levels of 165 mg/dl or higher). The HbA1c level of G1 corresponded in general to pre diabetics, mild diabetes or properly controlled diabetics (through oral medication).

As described below, one analysis performed was a Student t test for independent samples in each of the diabetic categories and for each of 7 variables (fasting glucose (FG), glycosylated hemoglobin (HbA1c), insulin, high density lipoprotein (HDL), low density lipoprotein (LDL), total cholesterol and triglycerides), comparing all participants who took the example nutraceutical formulation of the present disclosure, regardless of dosage, with those who did not take the example nutraceutical formulation (control treatment).

As illustrated in detail below, the bioactivity and nutraceutical characteristics associated with the nutraceutical formulations disclosed and/or employed herein actively participate in the remediation of early type II diabetes, by actually lowering FG and HbA1c. The nutraceutical formulations of the present disclosure also lower total cholesterol and LDL, thereby reducing the risks of cardiovascular disease associated with diabetes type II.

SUMMARY OF TEST AND RESULTS

A study with the objective of determining the impact of three dose levels of nutraceutical prepared in accordance with the current disclosure, taken twice daily over 3 months (90 days) on levels of fasting glucose (FG), glycosylated hemoglobin (HbA1c), insulin, high density lipoprotein (HDL), low density lipoprotein (LDL), total cholesterol and triglycerides in Type II hyperglycemic patients, was conducted. Participants were divided into 2 diabetic categories depending on HbA1c results: 40 adults with HbA1c <7.5% (G1) and 40 diabetics with HbA1c ≥7.5% (G2). Each category was further divided into 3 nutraceutical dosage groups of 10 participants each, namely 5 g, 10 g and 15 g taken twice daily for a consumption period of 90 days. A zero control treatment was also included.

Analysis of variance (ANOVA) showed significant decreases in fasting blood serum values for glucose, HbA1c, total cholesterol, tryglycerides, and low density lipoproteins in G1 participants. No significant differences were detected in the ANOVA of the G2 treatments. A treatment (dose) longitudinal analysis in the two categories showed that HbA1c and total cholesterol were significantly reduced by 11.4% and 18.2%, respectively, in the 15 gram G1 category. In the 15 gram treatment in the G2 category, glucose was significantly reduced by 32.20%, from an initial 263.89 mg/dl to 178.8 mg/dl after 90 days of twice daily intake of 15 g of nutraceutical.

Student t test also showed that in the G2 category fasting insulin concentration in the blood was significantly increased in a dose incremental fashion in all 3 nutraceutical treatments; the control group showed a minimal nonsignificant increase in insulin production, culminating with a statistically significant 1347.80% increase in fasting insulin in the 15 gr dose. The longitudinal analysis of the G1/15 g nutraceutical treatment also showed that even though non-significant, a −35.8% and −13.00% difference was detected in the triglyceride and LDL levels by the end of the study.

These results show that the nutraceutical disclosed herein has the capacity to substantially lower glucose, HbA1c, total cholesterol and LDL in diabetics, with a larger impact on people showing impaired glucose tolerance, characteristic of a pre-diabetic stage. In diabetics with higher glucose levels and HbA1c values such as the G2 category, insulin production is significantly increased, from deficient secretion to normal values and glucose levels are significantly reduced.

Nutraceutical Formulation

The following studies were performed using a stabilized rice bran nutraceutical derivative, with FDA-DSHEA compliance for human consumption. The nutraceutical formulations disclosed herein resulted, in part, from the combination of hydrophilic (soluble fraction) and lipophilic (fiber fraction) fractions extracted from stabilized rice bran as described in U.S. Pat. No. 8,945,642, which is herein incorporated by reference in its entirety for all that it contains.

In one aspect, the methods disclosed herein use nutraceutical formulations comprising nutritionally enhanced isolates of stabilized rice bran having a soluble fraction/fiber fraction ratio of from 0.5 to 1.5; 0.75 to 1.25; 1.0 to 1.5; 1.0 to 1.4; 1.0 to 1.3, 1.0 to 1.20; or 1.0 to 1.15.

Blending and preparation of the finished nutraceutical formulation was done following the ingredient proportions shown below in Table 1. To accommodate varied taste preferences, the amount of vanilla was adjusted in some instances to 0.1%, while all other parameters in the formulation of Table 1 remained unchanged.

TABLE 1

Proportions of ingredients utilized in the formulation of nutraceutical finished powdered beverage used in the hyperglycemic studies described herein.

| | | lb. of finished product | |
|---|---|---|---|
| Ingredient | % | 1000 | 600 |
| Soluble Fraction | 49.53 | 495.3 | 297.18 |
| Fiber Fraction | 42.97 | 429.7 | 257.82 |
| Customized Premix | 3 | 30 | 18 |
| Sweetener | 2 | 20 | 12 |

TABLE 1-continued

Proportions of ingredients utilized in the formulation of nutraceutical finished powdered beverage used in the hyperglycemic studies described herein.

| | | lb. of finished product | |
|---|---|---|---|
| Ingredient | % | 1000 | 600 |
| CMC Gum | 1.3 | 13 | 7.8 |
| Vanilla | 1.2 | 12 | 7.2 |
| TOTAL | 100 | 1000 | 600 |

The customized premix used to prepare the finished nutraceutical formula is a vitamin and mineral premix comprising, per 6.7 grams of the premix: 200 IU Vitamin D3 (as Cholecalciferol, USP-FCC); 30 IU Vitamin E (as acetate, USP-FCC); 90 mcg Biotin (USP); 6 mg Niacin (as Niacinamide, USP-FCC); 3 mg Pantothenic Acid (as D-Calcium Pantothenate, USP); 1.8 mcg Vitamin B12 (as Cyanocobalamin, USP); 60 mg Vitamin C (as Sodium Ascorbate, USP-FCC); 24 mcg Vitamin K1 (as Phytonadione, USP); 450 mg (Calcium (as Calcium Lactate, USP-FCC); 54 mcg Chromium (as Chromium Picolinate, USP); 37.5 mcg Iodine (as Potassium Iodide, USP-FCC); 120 mg Magnesium (as Magnesium Phosphate, USP-FCC); 22.5 mcg Molybdenum (as Sodium Molybdate); 350 mg Phosphorous (as Dipotassium Phosphate, anhy., FCC) and (Magnesium Phosphate, FCC); 1050 mg Potassium (as Dipotassium Phosphate, anhy., FCC) and (Potassium Chloride, USP-FCC); 17.5 mcg Selenium (as Sodium Selenite); and 6 mg Zinc (as Zinc Sulfate, USP-FCC).

The study disclosed herein was designed as an open label research study, where both the researchers and the participants knew the dosage of the nutraceutical (from Table 1 above) that would be received twice daily, for a 90-day period.

The group invited to participate in the study was comprised of diagnosed or previously undiagnosed Type II hyperglycemic adult males or females older than 30 years of age and younger than 65 years old. Oral medication was accepted but not insulin dependent hyperglycemics. Fasting blood serum glucose levels ≥105 mg/dl were also required for inclusion in the study, as well as overall good health as determined by (1) the consulting physician's health assessment, (2) normal urine chemistry results, and (3) normal kidney and liver function. The blood and urine chemistry methods can be seen in Table 2 below. All blood and urine chemistry was determined using a Merck Microlab 200 chemistry analyzer (Kenilworth, N.J.) while insulin was determined using a Rayto/RT-2100c microplate reader (Shenzhen, P. R. China).

TABLE 2

Methods applied in blood and urine chemistry analysis during the initial medical health screening and later blood testing.

| VARIABLE | METHOD | MANUFACTURER |
|---|---|---|
| Insulin | Accubind ELISA microwells | Monobind Inc., Lake Forest, CA |
| Glucose | Trinder, GOD-POD | Spinreact Girona, Spain |
| HbA1c | Quantitative colorimetric Stanbio glycohemoglobn procedure No. P350 | StanBio Laboratory, Boerne, TX |
| Colesterol | Spinreact CHOP-POD enzymatic/colorimetric | Spinreact Girona, Spain |
| HDL | Spinreact HDL-P | Spinreact Girona, Spain |

TABLE 2-continued

Methods applied in blood and urine chemistry analysis during the initial medical health screening and later blood testing.

| VARIABLE | METHOD | MANUFACTURER |
|---|---|---|
| LDL | Total cholesterol-HDL | |
| Triglycerides | GPO-POD enzymatic/ colorimetric | Spinreact Girona, Spain |
| TGO (liver) | GOT (AST)-LQ | Spinreact Girona, Spain |
| TGP (liver) | GPT (ALT)-LQ | Spinreact Girona, Spain |
| Creatinine (kidley) | Creatinine J | Spinreact Girona, Spain |
| Urine chemistry | Urinalysis Reagent Strips | Spinreact Girona, Spain |

Experimental Design

The experimental design, as shown in Table 3 below, was a 2×4 factorial arrangement where participants were divided into two hyperglycemic categories based on HbA1c results: Group I (G1), comprised of 40 hyperglycemics with HbA1c ≤7.49% and Group 2 (G2) which included 40 diabetics with HbA1c ≥7.5%.

Each category group was further divided into 4 treatments, each with 10 participants and consisting of 3 nutraceutical (from Table 1 above) dosages (5 g, 10 g and 15 g) in addition to one control treatment. Since the study contemplated two daily rations, participants consumed either 10 g, 20 g or 30 g daily of the nutraceutical described in Table 1, depending on the treatment placement.

TABLE 3

Arrangement of 8 treatments in the 4 × 2 factorial design for the nutraceutical hyperglycemic study in Guatemala. Each treatment was initially comprised of 10 participants for a total of 80 Type II hyperglycemics.

| | Factor A - Nutraceutical dose (twice daily) | | | |
|---|---|---|---|---|
| Factor B - HbA1c range | 0 g | 5 g | 10 g | 15 g |
| 6.1%-7.49% (Group 1) | G1, 0 | G1, 5 | G1, 10 | G1, 15 |
| ≥7.5% (Group 2) | G2, 0 | G2, 5 | G2, 10 | G2, 15 |

Consumption of the nutraceutical, which was formulated and packaged in individual sachets, occurred over a three month time period.

Blood Sampling and Testing

Following the initial base line blood testing shown in Table 2, two subsequent blood testing were taken from participants at 45 days into the consumption window and at 90 days (at the end of the nutraceutical intervention period). Blood chemistry variables at the 45 and 90 benchmark included the glucose-related variables fasting glucose, HbA1c and fasting insulin. Lipid-related variables included total cholesterol, low density lipoprotein, high density lipoprotein and triglycerides.

Results

Selection of Participants

The results of diabetes screening events are shown in Table 4.

TABLE 4

Summary of results for hyperglycemic detection events.

| Number of Participants | Total Pre-Prandial hyperglicemcs (FG > 120) | Total Pre-Prandial slightly hyperglycemics (FG 100-120) | Total normal FG (<100) |
|---|---|---|---|
| 37 | 15 | 10 | 12 |
| 43 | 18 | 13 | 12 |
| 27 | 8 | 3 | 16 |
| 20 | 3 | 1 | 16 |
| 44 | 9 | 6 | 29 |
| 22 | 14 | 1 | 7 |
| 193 | 67 | 34 | 92 |

In addition to the 193 detections test conducted, 22 more potential participants were also screened for a total 215 fasting and post prandial glucose tests. Following the administration of glucose tests, potential participants were selected based on the fasting (≥105 mg/dl) and post-prandial blood glucose (≥140 mg/dl) results, as well as other parameters including age, willingness to participate, known health risks, insulin dependency and Body mass index (BMI).

Of 215 potential participants, 122 were invited to assist with an initial baseline screening, which included fasting blood chemistry and urine chemistry as well as medical clinical evaluations. These evaluations took place 3 or 4 times a week over approximately a 4 week period. A total of 122 potential participants were evaluated and 81 participants were finally selected to be in the study (Table 5).

TABLE 5

Final group of selected participants for nutraceutical (from Table 1)/hyperglycemics study.

| Number of screened potential participants | Number of selected participants, based on lab results and medical check up |
|---|---|
| 13 | 9 |
| 9 | 6 |
| 15 | 10 |
| 14 | 12 |
| 13 | 9 |
| 10 | 5 |
| 15 | 11 |
| 6 | 5 |
| 18 | 10 |
| 9 | 5 |
| 122 | 82 |

Of the 82 screened potential candidates, 81 were divided into two categories according to their HbA1c results: 40 participants with glycosylated hemoglobin (percentage of glycated hemoglobin in the blood) between 6.1% and 7.49% (labeled group G1) and 41 participants with HbA1c results ≥7.5%, labeled group G2.

The hyperglycemic women in category G1 averaged 54.14±8.29 years of age with an average BMI of 29.87±9.69, while men and 138.7 (±28.5) FG; 70% of participants were female. In contrast, hyperglycemics in category G2 showed an average of 9.31% (±1.27%) HbA1c, 258 mg/dl (±52.4) FG and averaged 52.1 years of age; 68% of participants were female.

Once the two main hyperglycemic groups were conformed, participants in each main group were randomly assigned to 1 of 4 nutraceutical dose group (treatments-T-) as follows: TI, 0 grams (control group); T2: 5 grams twice a day; T3: 10 grams twice a day; and T4: 15 grams twice a day, all as mid-morning and mid-afternoon snacks. The mean blood chemistry results for each diabetic group can be seen in Table 6, while the age and body mass index (BMI) information is found in Table 7.

TABLE 6

Mean (±standard deviation -SD-) blood chemistry results for diabetic groups G1 and G2.

| DIABETIC GROUP | MEAN/SD | F.GLUC mg/dl | HbA1C (%) | TGO UI/L | TGP UI/L | Tot. Col. Mg/dl | HDL mg/dl | LDL mg/dl | TRIG md/dl | CREAT mg/dl | INSULIN uIU/ml |
|---|---|---|---|---|---|---|---|---|---|---|---|
| G1 | MEAN | 138.7 | 6.71% | 38.7 | 30.2 | 205.6 | 56.5 | 108.2 | 206.7 | 0.8 | 7 |
|  | SD | 28.47 | 0.38% | 12.88 | 10.08 | 49.98 | 11.28 | 34.01 | 119.7 | 0.18 | 7.07 |
| G2 | MEAN | 258.6 | 9.31% | 34.2 | 27.8 | 209.7 | 57.3 | 106 | 256.3 | 0.9 | 2.3 |
|  | SC | 52.45 | 1.27% | 8.24 | 10.23 | 44.68 | 10.47 | 30.44 | 183.9 | 0.24 | 3.09 |

F.GLUC: FG; HbA1c: glycosylated hemoglobin; TGO: aspartate aminotransferase; TGP: alanine aminotransferase; Tot. Col: total cholesterol; HDL: highly density lipoprotein; LDL: low density lipoprotein; TRIG: triglycerides; CREAT: creatinin.

TABLE 7

Mean age and body mass index of women and men participating in diabetic groups GI and G2.

| DIABETIC GROUP | WOMEN | | | MEN | | |
|---|---|---|---|---|---|---|
|  | n | age | BMI | n | age | BMI |
| G1 | 28 | 53.97 ± 7.93 | 31.26 ± 5.42 | 10 | 57.25 ± 5.55 | 24.96 ± 3.00 |
| G2 | 28 | 58.18 ± 9.29 | 26.77 ± 4.09 | 13 | 52.38 ± 8.16 | 24.88 ± 3.24 |

Analysis

The analysis of results has been structured as follows:

1. Summary of descriptive statistics: An exploratory analysis of the results was performed using the statistical software INFOSTAT 2015p. In this descriptive procedure, descriptive statistics for each of the parameters (variables) obtained in the initial, midterm and final blood sampling are presented.

2. Comparison of dependent variables in nutraceutical dosage treatments: This analysis was performed using a Student T test for independent samples applied to two populations. The first population comprised all participants that took the nutraceutical and the second population included those who did not take the nutraceutical nutritional supplement. The purpose of this analysis was to explore in a general qualitative sense the effect of the nutraceutical on the dependent variables, without discriminating between dosages.

3. Analysis of Variance (ANOVA) for comparison of dependent variables between treatments: An ANOVA for a completely randomized design was performed on each of the two diabetic groups, G1 and G2, applying the following model:

$$Y_i = \mu + T_i + \varepsilon_i$$

where $Y_i$=Response associated to the experimental unit; $\mu$=global mean; $T_i$=effect of the i-th dose of the nutraceutical; $\varepsilon$=experimental error associated to the i-th experimental unit.

4. Longitudinal analysis for "before and after" effect of the nutraceutical among participants: A Student t test for paired data was applied to all 7 dependent variables obtained for the initial and final blood sample of participants. This analysis was run with the objective of determininG If there had been any statistically significant effects on the 3 diabetes related factors and the 4 lipid-associated parameters before the participants started consuming the nutraceutical and at the end of the 90 day window.

5. Descriptive analysis of "before and after" normal range values of the 7 dependent variables among participants in the two diabetic groups and 4 treatments.

1. Summary of Descriptive Statistics

As shown in Table 8, by the end of the study, the G1 control group exhibited an increase of 22.78 mg/dl in the mean FG, while the 15 g dose participants lowered in average their FG by 7.1 mg/dl. Fasting glucose in participants in the 5 g and 10 g remained practically unchanged. Regarding G2 participants, while the control group showed a slight reduction (5%) of FG by the end of the trial, the nutraceutical treatments showed an increased effectiveness for lowering FG as the nutraceutical dosage increased, culminating with a 32% FG decrease in the 15 g treatment.

TABLE 8

Summary of descriptive statistics for the variable Glucose -GLUC- (mg/dl) according to date of blood testing.

| Group | Treatment | n | Date 1 (0 days) | | | Date 2 (45 days) | | | Date 3 (90 days) | | |
|---|---|---|---|---|---|---|---|---|---|---|---|
|  |  |  | Mean | SD | CV | Mean | SD | CV | Mean | SD | CV |
| G1 | 15 g | 9 | 134.8 | 31.8 | 23.59 | 128.4 | 23.77 | 18.51 | 127.1 | 35.77 | 28.14 |
|  | 10 g | 7 | 126.96 | 18.05 | 14.22 | 104.71 | 23.64 | 22.57 | 129.67 | 52.96 | 40.84 |
|  | 5 g | 7 | 143.86 | 27.11 | 18.85 | 182.71 | 74.37 | 40.7 | 145.41 | 56.46 | 38.83 |
|  | Control | 11 | 142.49 | 34.65 | 24.32 | 181.05 | 58.09 | 32.09 | 165.27 | 94.01 | 56.88 |
| G2 | 15 g | 7 | 263.89 | 23.83 | 9.03 | 216.36 | 113.01 | 52.23 | 178.84 | 87.53 | 48.94 |
|  | 10 g | 8 | 267.05 | 55.96 | 20.95 | 261.61 | 85.61 | 32.72 | 213.39 | 62.89 | 29.47 |

TABLE 8-continued

Summary of descriptive statistics for the variable Glucose -GLUC- (mg/dl) according to date of blood testing.

| Group | Treatment | n | Date 1 (0 days) | | | Date 2 (45 days) | | | Date 3 (90 days) | | |
|---|---|---|---|---|---|---|---|---|---|---|---|
| | | | Mean | SD | CV | Mean | SD | CV | Mean | SD | CV |
| | 5 g | 9 | 248.83 | 36.11 | 14.51 | 221.98 | 60.71 | 27.35 | 228.96 | 81.79 | 35.72 |
| | Control | 7 | 227.9 | 43.72 | 19.19 | 226.04 | 108.49 | 48 | 217.54 | 72 | 33.1 |

G1 refers to diabetics with HbA1c >6.1 and ≤7.49; G2 included diabetics with HbA1c ≥7.50; Treatment refers to the dose of the nutraceutical taken twice daily.
Control refers to the group of participants not taking the nutraceutical.
SD = standard deviation of the mean and CV = coefficient of variation.

Similar to FG, the G1 HbA1 control group exhibited by the end of the consumption window, an increase in the mean HbA1c (0.35 percentage points). In contrast, the 15 g dose participants lowered in average their HbA1c by 0.77% (Table 9). This is a qualitative, clinically significant result because while a 6.74% HbA1c is diagnosed as diabetes, a 5.97% HbA1c result is categorized as prediabetes, and very close to the 5.7 upper limit normal result. HbA1c in the G1 5g and 10 g participants was s lightly reduced by 0.24% and 0.33%, respectively. It is noteworthy to mention that in both the 5 g and 10 g G1 groups, the mean initial HbA1c value was above the threshold for a diabetic diagnosis but by the end of the 90 day consumption period, the mean value in the 10 9 group was lowered to a pre-diabetic condition.

TABLE 9

Summary of descriptive statistics for the dependent variable Glycosylated Hemoglobin - HbA1c- (%) according to date of blood testing.

| Group | Treatment | n | Date 1 (0 days) | | | Date 2 (45 days) | | | Date 3 (90 days) | | |
|---|---|---|---|---|---|---|---|---|---|---|---|
| | | | Mean | SD | CV | Mean | SD | CV | Mean | SD | CV |
| G1 | 15 g | 9 | 6.74 | 0.41 | 6.11 | 6.21 | 0.31 | 5.06 | 5.97 | 0.51 | 8.59 |
| | 10 g | 7 | 6.6 | 0.42 | 6.32 | 6.07 | 0.65 | 10.65 | 6.27 | 0.99 | 15.79 |
| | 5 g | 7 | 6.8 | 0.35 | 5.19 | 7 | 0.75 | 10.76 | 6.56 | 1.17 | 17.85 |
| | Control | 11 | 6.68 | 0.45 | 6.67 | 7.23 | 1.23 | 17.06 | 7.03 | 1.7 | 24.23 |
| G2 | 15 g | 7 | 9.41 | 0.62 | 6.57 | 8.9 | 1.6 | 18.02 | 7.94 | 1.95 | 24.52 |
| | 10 g | 8 | 9.45 | 1.23 | 12.97 | 9.33 | 1.7 | 18.2 | 8.7 | 1.39 | 15.97 |
| | 5 g | 9 | 9.14 | 1.09 | 11.88 | 8.64 | 1.18 | 13.66 | 8.61 | 1.62 | 18.82 |
| | Control | 7 | 8.62 | 0.99 | 11.55 | 8.55 | 1.77 | 20.74 | 8.33 | 1.51 | 18.18 |

Fasting serum insulin was the third diabetes-related dependent variable. As Table 10 shows, G1 participants had a higher basal levels of insulin compared to the G2 diabetics. In G1, including with normal insulin production baseline results, (between 5.99 μUI/ml and 8.35 μUI/ml) there was an increase in insulin production in all three nutraceutical treatments. The control participants also showed slightly higher levels of insulin at the end of the study. The nutraceutical group of participants in G2 (HbA1c's ≥7.5) showed a substantial increase in insulin production. As Table 10 shows, while the G2 control participants slightly increased their fasting serum insulin from 4.13 μUI/ml to 5.96 μUI/ml, there was a marked incremental response in the nutraceutical doses, with fasting serum insulin increasing from 0.92 μUI/ml to 13.32 μUI/ml in the 15 g treatment.

TABLE 10

Summary of descriptive statistics for the dependent variable insulin (μUI/ml) according to date of blood testing.

| Group | Treatment | n | Date 1 (0 days) | | | Date 2 (45 days) | | | Date 3 (90 days) | | |
|---|---|---|---|---|---|---|---|---|---|---|---|
| | | | Mean | SD | CV | Mean | SD | CV | Mean | SD | CV |
| G1 | 15 g | 9 | 8.31 | 7.40 | 89.09 | 8.27 | 6.08 | 73.47 | 12.17 | 7.33 | 60.21 |
| | 10 g | 7 | 8.35 | 11.82 | 141.4 | 8.09 | 10.1 | 124.9 | 9.16 | 4.19 | 45.71 |
| | 5 g | 7 | 7.7 | 7.26 | 94.35 | 5.43 | 5.31 | 97.82 | 25.95 | 42.19 | 162.6 |
| | Control | 11 | 5.99 | 5.7 | 95.11 | 5.18 | 4.46 | 86.12 | 8.67 | 4.84 | 55.89 |
| G2 | 15 g | 7 | 0.92 | 1.14 | 123.1 | 2.52 | 2.52 | 100.1 | 13.32 | 10.66 | 80.03 |
| | 10 g | 8 | 2.22 | 1.84 | 83.13 | 3.69 | 2.28 | 61.83 | 8.23 | 2.79 | 33.85 |
| | 5 g | 9 | 2 | 2.25 | 112 | 1.97 | 2.14 | 109.1 | 5.94 | 4.08 | 68.71 |
| | Control | 7 | 4.13 | 4 | 96.67 | 5.35 | 3.31 | 61.96 | 5.96 | 5.68 | 95.24 |

The lipid related dependent variables also showed decreased concentrations at the end of the nutraceutical consumption window, even though values were not excessively high in the participants at the beginning of the trial. For example, total cholesterol (Table 11) was lowered by 19%, in the G1 15g treatment, from 2 17.3 mg/dl to 177.7 mg/dl. In the G2 group, there was a slight decrease in all treatments ranging from 2.42% in the 15 g treatment to 6.67% in the 10 g treatment.

TABLE 11

Summary of descriptive statistics for the dependent variable
Total Cholesterol (mg/dl) according to date of blood testing.

| | | | Date 1 (0 days) | | | Date 2 (45 days) | | | Date 3 (90 days) | | |
|---|---|---|---|---|---|---|---|---|---|---|---|
| Group | Treatment | n | Mean | SD | CV | Mean | SD | CV | Mean | SD | CV |
| G1 | 15 g | 9 | 217.3 | 46.37 | 21.34 | 174.14 | 42.87 | 24.62 | 177.7 | 35.09 | 19.74 |
| | 10 g | 7 | 190.3 | 35.5 | 18.65 | 177.07 | 27.2 | 15.36 | 183.13 | 38.22 | 20.87 |
| | 5 g | 7 | 174.13 | 59.2 | 34 | 171.34 | 52.37 | 30.57 | 165.04 | 46.82 | 28.37 |
| | Control | 11 | 214.45 | 47 | 21.92 | 203.68 | 53.43 | 26.23 | 187.02 | 34.52 | 18.46 |
| G2 | 15 g | 7 | 207.73 | 41.47 | 19.96 | 169.16 | 25.54 | 15.1 | 202.41 | 28.79 | 14.23 |
| | 10 g | 8 | 217.41 | 31.28 | 14.39 | 204.81 | 34.51 | 16.85 | 202.89 | 25.79 | 12.71 |
| | 5 g | 9 | 191.97 | 38.91 | 20.27 | 186.62 | 40.31 | 21.6 | 184.32 | 46.59 | 25.27 |
| | Control | 7 | 205.26 | 58.13 | 28.32 | 209.63 | 49.04 | 23.39 | 195.16 | 43.68 | 22.38 |

High density lipoproteins (Table 12) showed an improvement in the 15 g, G2 participants, where HDL was increased from a mean value of 55.93 mg/dl (n=7) to 58.16 mg/dl, an increase equivalent to 4% HDL. The rest of the treatments in both G1 and G2 showed decreases in HDL values at the final blood testing.

TABLE 12

Summary of descriptive statistics for the dependent variable High Density
Lipoproteins - HDL- (mg/dl) according to date of blood testing.

| | | | Date 1 (0 days) | | | Date 2 (45 days) | | | Date 3 (90 days) | | |
|---|---|---|---|---|---|---|---|---|---|---|---|
| Group | Treatment | n | Mean | SD | CV | Mean | SD | CV | Mean | SD | CV |
| G1 | 15 g | 9 | 58.31 | 9.51 | 16.31 | 50.02 | 13.47 | 26.93 | 52.47 | 10.73 | 20.44 |
| | 10 g | 7 | 51.94 | 10.09 | 19.42 | 49.89 | 6.61 | 13.25 | 49.64 | 6.93 | 13.95 |
| | 5 g | 7 | 51.34 | 15.9 | 30.97 | 51.07 | 15.72 | 30.78 | 47.66 | 10.18 | 21.36 |
| | Control | 11 | 60.24 | 9.56 | 15.88 | 57.52 | 16.8 | 29.2 | 53.81 | 9.32 | 17.33 |
| G2 | 15 g | 7 | 55.93 | 11.98 | 21.43 | 46.24 | 6.57 | 14.2 | 58.16 | 8.13 | 13.97 |
| | 10 g | 8 | 58.25 | 6.86 | 11.77 | 54.59 | 9.33 | 17.1 | 54.18 | 4.91 | 9.06 |
| | 5 g | 9 | 53.71 | 11.27 | 20.99 | 53.06 | 12.59 | 23.74 | 50.58 | 11.16 | 22.06 |
| | Control | 7 | 56.89 | 11.22 | 19.72 | 57.4 | 11.7 | 20.39 | 55.86 | 10.74 | 19.22 |

Regarding LDL (Table 13), participants in all 8 treatments exhibited initially mean levels within the normal range of 70-170 mg/dl. In the G2 group, while the control treatment participants exhibited a −4.20% mean LDL difference between the initial an final testing, the 10 g nutraceutical treatment group showed a reduction of 15.11%, from an initial 116.79 mg/dl to a final 99.14 mg/dl of blood LDL.

TABLE 13

Summary of descriptive statistics for the dependent variable Low Density
Lipoproteins -LDL- (mg/dl) according to date of blood testing.

| | | | Date 1 (0 days) | | | Date 2 (45 days) | | | Date 3 (90 days) | | |
|---|---|---|---|---|---|---|---|---|---|---|---|
| Group | Treatment | n | Mean | SD | CV | Mean | SD | CV | Mean | SD | CV |
| G1 | 15 g | 9 | 105.06 | 31.45 | 29.93 | 86.1 | 23.76 | 27.59 | 91.34 | 14.96 | 16.38 |
| | 10 g | 7 | 91.27 | 27.01 | 29.6 | 75.81 | 21.54 | 28.42 | 90.43 | 23.13 | 25.58 |
| | 5 g | 7 | 95.69 | 34.77 | 36.33 | 88.31 | 17.78 | 20.13 | 80.2 | 15.56 | 19.4 |
| | Control | 11 | 120.49 | 32.87 | 27.28 | 100.15 | 28.76 | 28.72 | 101.75 | 31.08 | 30.55 |
| G2 | 15 g | 7 | 104.06 | 29.46 | 28.31 | 85.19 | 13.68 | 16.06 | 106.21 | 27.41 | 25.81 |
| | 10 g | 8 | 116.79 | 21.97 | 18.81 | 99.61 | 20.23 | 20.31 | 99.14 | 11.84 | 11.95 |
| | 5 g | 9 | 97.37 | 35.65 | 36.62 | 95.72 | 30.29 | 31.64 | 95.09 | 36.14 | 38 |
| | Control | 7 | 101.87 | 32.61 | 32.01 | 105.14 | 39.79 | 37.84 | 97.59 | 28.89 | 29.6 |

Triglycerides was the fourth lipid-related blood factor included in the blood tests. As Table 14 shows, there was a decrease in triglyceride levels in both G1 and G2 groups at the I5g nutraceutical dosage but the 35% reduction in the G1 15g treatment (from 291.13 mg/dl to 186.9 mg/dl) was substantial, particularly when contrasted with the G1 control group (which exhibited a 7% improvement).

TABLE 14

Summary of descriptive statistics for the dependent variable Triglycerides - TRIGS- (mg/dl) according to date of blood testing.

| Group | Treatment | n | Date 1 (0 days) | | | Date 2 (45 days) | | | Date 3 (90 days) | | |
|---|---|---|---|---|---|---|---|---|---|---|---|
| | | | Mean | SD | CV | Mean | SD | CV | Mean | SD | CV |
| G1 | 15 g | 9 | 291.13 | 205.26 | 70.5 | 189.02 | 105.15 | 55 | 186.9 | 111.9 | 59.87 |
| | 10 g | 7 | 219.3 | 50.82 | 23.17 | 324.97 | 160.4 | 49.35 | 215.96 | 85.81 | 39.74 |
| | 5 g | 7 | 135.43 | 68.67 | 50.7 | 167.56 | 102.6 | 61.22 | 189.36 | 166.3 | 87.84 |
| | Control | 11 | 174.37 | 62.4 | 35.79 | 218.46 | 88.36 | 40.45 | 162.23 | 69.68 | 42.95 |
| G2 | 15 g | 7 | 240.83 | 125.3 | 52.03 | 189.27 | 53.98 | 28.52 | 222.46 | 167.1 | 75.1 |
| | 10 g | 8 | 212.16 | 36.66 | 17.28 | 256.71 | 99.32 | 38.69 | 247.24 | 110.8 | 44.82 |
| | 5 g | 9 | 226.89 | 133.7 | 58.95 | 189.91 | 74.77 | 39.37 | 238.22 | 160.6 | 67.4 |
| | Control | 7 | 285.83 | 272.8 | 95.43 | 261.71 | 82.89 | 31.67 | 248.37 | 168.1 | 67.68 |

2. Comparison of Dependent Variables in the Nutraceutical Dosage Treatments Versus the Control Treatment This test was conducted with the objective of determining the overall effect of the nutraceutical on the diabetes and lipid related blood indicators, contrasting the results of those who took the nutraceutical supplement with the participants in the control treatment. This test grouped all the results of those who took the nutraceutical and compared them to the means of all the results obtained from those who did not take the nutraceutical (n=33). Table 15 shows the comparison for the overall effects of the nutraceutical for the G1+nutraceutical (N=69) in contrast to the mean of all results obtained from blood tests on individuals who did not take nutraceutical (N=33). Of the seven dependent variables, all three glucose-related parameters showed statistically significant differences between the two groups. The lipid related parameters total cholesterol and LDL also showed significant effects, with reduced levels in the + nutraceutical group in contrast to the control treatment group. Table 16 shows the same comparison of + nutraceutical (N=72) blood results vs. no nutraceutical blood test results (N=21) for participants in the G2 category, where no significant differences were detected between the overall means of the 7 dependent variables. However a substantial reduction of −40.42 mg/dl was observed in the triglyceride levels of the blood tests of those who took the nutraceutical in comparison to those who did not take the supplement.

TABLE 15

Overall effect of the nutraceutical consumption between blood test results of those who took the nutraceutical compared to participants who did not consume the nutraceutical supplement (control treatment) in G1 participants.

| Variable | Plus Nutra-ceutical | No Nutra-ceutical | Difference In Means | P-Value | Test |
|---|---|---|---|---|---|
| GLUC (mg/dl) | 135.45 | 162.94 | −27.49 | 0.0360 | *− |
| HbA1c (%) | 6.45 | 6.98 | −0.53 | 0.0265 | *− |
| COL. TOT (mg/dl) | 181.88 | 201.72 | −19.84 | 0.0366 | *+ |
| HDL (mg/dl) | 51.57 | 57.19 | −5.62 | 0.0233 | *+ |
| LDL (mg/dl) | 89.78 | 107.46 | −17.69 | 0.0023 | *+ |

TABLE 15-continued

Overall effect of the nutraceutical consumption between blood test results of those who took the nutraceutical compared to participants who did not consume the nutraceutical supplement (control treatment) in G1 participants.

| Variable | Plus Nutra-ceutical | No Nutra-ceutical | Difference In Means | P-Value | Test |
|---|---|---|---|---|---|
| TRIG (mg/dl) | 214.08 | 185.02 | 29.06 | 0.1658 | NS− |
| INSULIN (uUl/ml) | 10.31 | 6.61 | 3.7 | 0.0740 | NS− |

TABLE 16

Overall effect of the nutraceutical consumption between blood test results of those who took the nutraceutical compared to participants who did not consume the nutraceutical supplement (control treatment) in G2 participants.

| Variable | Plus Nutra-ceutical | No Nutra-ceutical | Difference In Means | P-Value | Test |
|---|---|---|---|---|---|
| GLUC (mg/dl) | 234 | 223.83 | 10.17 | 0.5759 | NS+ |
| HbA1c (%) | 8.9 | 8.5 | 0.41 | 0.2457 | NS+ |
| COL. TOT (mg/dl) | 196.14 | 203.35 | −7.21 | 0.4632 | NS+ |
| HDL (mg/dl) | 53.81 | 56.71 | −2.9 | 0.2427 | NS+ |
| LDL (mg/dl) | 99.81 | 101.53 | −1.73 | 0.8047 | NS+ |
| TRIG (mg/dl) | 224.89 | 265.3 | −40.42 | 0.3433 | NS− |
| INSULIN (uUl/ml) | 4.44 | 5.15 | −0.71 | 0.5780 | NS+ |

3. Analysis of Variance (ANOVA)

3.1 Kruskal-Wallis ANOVA

A nonparametric Kruskal-Wallis ANOVA was applied using the statistical package INFOSTAT. As Table 17 shows, in the G1 significant differences were found in the diabetes related variables FG and HbA1c. In the lipid related variables significant differences were found in Total Cholesterol, LDL and Triglycerides. No significant differences were found in HDL or Insulin. With regards to the G2 group, no significant differences were found between treatments in any of the 7 tested variables (Table 18).

TABLE 17

Non-parametric analysis of variance results for blood test variables in the group of G1 participants with HbA1c ≥6.1 and ≤7.49%.

| VARIABLE | P-VALUE | |
|---|---|---|
| GLUCOSE (mg/dl) | 0.0067 | * |
| HbA1c (%) | 0.0375 | * |
| TOTAL COLESTEROL (mg/dl) | 0.0403 | * |
| HDL (mg/dl) | 0.0625 | NS |
| LDL (mg/dl) | 0.0127 | * |
| TRIGLYCERIDES (mg/dl) | 0.0121 | * |
| INSULIN (uUl/ml) | 0.4371 | NS |

Asterisk denotes statistically significant differences (p ≤ 0.05) detected in at least one of the treatments.

TABLE 18

Non-parametric analysis of variance results for blood test variables in the group of G2 participants with HbA1c ≥7.5%.

| VARIABLE | P-VALUE | |
|---|---|---|
| GLUCOSE (mg/dl) | 0.5511 | NS |
| HbA1c (%) | 0.3557 | NS |
| TOTAL COLESTEROL (mg/dl) | 0.3185 | NS |
| HDL (mg/dl) | 0.6044 | NS |
| LDL (mg/dl) | 0.5512 | NS |
| TRIGLYCERIDES (mg/dl) | 0.4314 | NS |
| INSULIN (uUL/ml) | 0.2284 | NS |

Asterisk denotes statistically significant differences (p ≤ 0.05) detected in at least one of the treatments, while NS refers to statistically non-significant differences.

3.2 A Posteriori Mean Comparison Tests for Variables Showing Statistically Significant Differences (A=95) According to the Kruskal Wallis Non-Parametric ANOVA.

FIGS. 1A-1E show a posteriori mean comparison tests for variables showing statistically significant differences (p≤0.05) between treatments in the G1 group of participants, according to the Kruskal-Wallis non parametric ANOVA. As FIGS. 1A-1E show, the variables glucose, HbA1c, total cholesterol and LDL all showed significant reductions in their fasting levels, with the control treatment in a discrete category all of its own. The most significant reductions were generally found in the 15 g and 10 g treatments, even though the 5 g treatment also showed marked improvements in total cholesterol and LDL.

4. Longitudinal Analysis for "Before and After" Effect of Nutraceutical Among Participants With the exception of HDL, all dependent variables in the G1-15 g treatment showed a favorable response on the longitudinal analysis as determined by the Student t test for paired data (Table 19). In the glucose-related variables, HbA1c exhibited a statistically significant 11.40% reduction, while FG was reduced by 5.70%. Insulin levels were increased by 46.50% but were non-significant. Regarding the lipid-related variables, total cholesterol was significantly reduced by 18.20% (p<0.05) and LDL by 13.00%. Triglycerides were reduced by 35.80% having started at 291.13 mg/dl and ended at 186.9 mg/dl. The reason for the triglyceride results being non-significant (even though substantial) may lie on the fact that the data was too disperse and did not follow a normal distribution, according to the statistical software INFOS TAT.

TABLE 19

Student t test results for comparison of "before and after" mean blood test results for 7 variables in each of the treatments of the G1 group of participants.

| Treatment | Variable | N | Initial | Final | Difference[1] | p-value | |
|---|---|---|---|---|---|---|---|
| 15 g | GLUC mg/dl | 9 | 134.8 | 127.1 | −5.70% | 0.6474 | NS |
| | HbA1c (%) | 9 | 6.74 | 5.97 | −11.40% | 0.0173 | * |
| | INSULIN uUI/ml | 9 | 8.31 | 12.17 | 46.50% | 0.2578 | NS |
| | COL. TOT (mg/dl) | 9 | 217.3 | 177.7 | −18.20% | 0.0088 | * |
| | HDL (mg/dl) | 9 | 58.31 | 52.47 | −10.00% | 0.0702 | NS |
| | LDL (mg/dl) | 9 | 105.06 | 91.34 | −13.00% | 0.2039 | NS |
| | TRIG (mg/dl) | 9 | 291.13 | 186.9 | −35.80% | 0.2058 | NS |
| 10 g | GLUC mg/dl | 7 | 126.96 | 129.67 | 2.10% | 0.8898 | NS |
| | HbA1c (%) | 7 | 6.6 | 6.27 | −5.00% | 0.4516 | NS |
| | INSULIN uUI/ml | 7 | 8.35 | 9.16 | 9.60% | 0.8261 | NS |
| | COL. TOT (mg/dl) | 7 | 190.3 | 183.13 | −3.08% | 0.6251 | NS |
| | HDL (mg/dl) | 7 | 51.94 | 49.64 | −4.40% | 0.5618 | NS |
| | LDL (mg/dl) | 7 | 91.27 | 90.43 | −0.90% | 0.9365 | NS |
| | TRIG (mg/dl) | 7 | 219.3 | 215.96 | −1.50% | 0.9229 | NS |
| 5 g | GLUC mg/dl | 7 | 143.86 | 145.41 | 1.10% | 0.9531 | NS |
| | HbA1c (%) | 7 | 6.8 | 6.56 | −3.40% | 0.6464 | NS |
| | INSULIN uUI/ml | 7 | 7.7 | 6.44 | −16.36 | 0.2989 | NS |
| | COL. TOT (mg/dl) | 7 | 174.13 | 165.04 | −5.20% | 0.5702 | NS |
| | HDL (mg/dl) | 7 | 51.34 | 47.66 | −7.20% | 0.3995 | NS |
| | LDL (mg/dl) | 7 | 95.69 | 80.2 | −16.20% | 0.2004 | NS |
| | TRIG (mg/dl) | 7 | 135.43 | 189.36 | 39.80% | 0.2679 | NS |
| Control | GLUC mg/dl | 11 | 142.49 | 165.27 | 16.00% | 0.3799 | NS |
| | HbA1c (%) | 11 | 6.68 | 7.03 | 5.20% | 0.4438 | NS |
| | INSULIN uUI/ml | 11 | 5.99 | 8.67 | 44.70% | 0.2859 | NS |
| | COL. TOT (mg/dl) | 11 | 214.45 | 187.02 | −12.80% | 0.1204 | NS |
| | HDL (mg/dl) | 11 | 60.24 | 53.81 | −10.70% | 0.1229 | NS |
| | LDL (mg/dl) | 11 | 120.49 | 101.75 | −15.60% | 0.1377 | NS |
| | TRIG (mg/dl) | 11 | 174.37 | 162.23 | −7.00% | 0.5761 | NS |

In the G2 diabetic group longitudinal analysis (Table 20), their resulted a significant increase in insulin levels in all 3 nutraceutical treatments in contrast to the control group which was not statistically significant (p=0.1552). The greatest increase was observed in the 15 G1 nsulin levels with a final fasting Glnsulin concentration of 13.32 µIU/ml after having started at the below normal basal level of 0.92 µIU/ml), an indicator for an almost non-existent insulin production by the pancreas. The FG levels were also significantly reduced (P<0.05) in the G2-15 g treatment but the HbA1c levels, even though substantial at −15.60% were not found to be significant. HDL levels were increased by 4%, while the rest of treatments showed reductions in the final HDL values. In the nutraceutical treatments total cholesterol was reduced between 2.6% and 6.7% and LDL between 2.10% and 15.10% (10 g nutraceutical).

Figure 5:
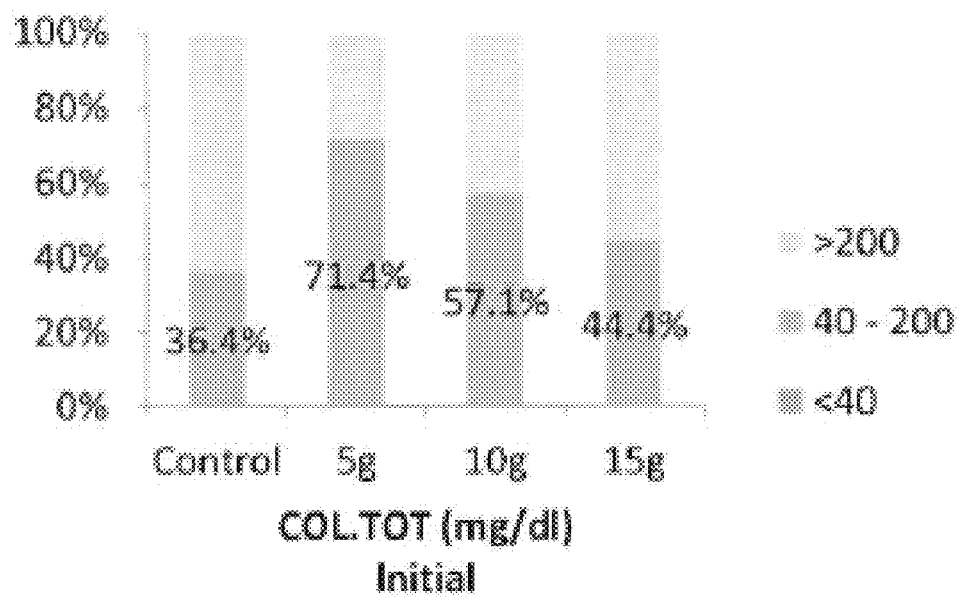
FIG. 5. Percentage of participants falling within normal of total cholesterol values (40-200 mg/dl) before and after the nutraceutical intervention in the 4 dose treatments of the nutraceutical for the G1 diabetic group.
Figure 5:
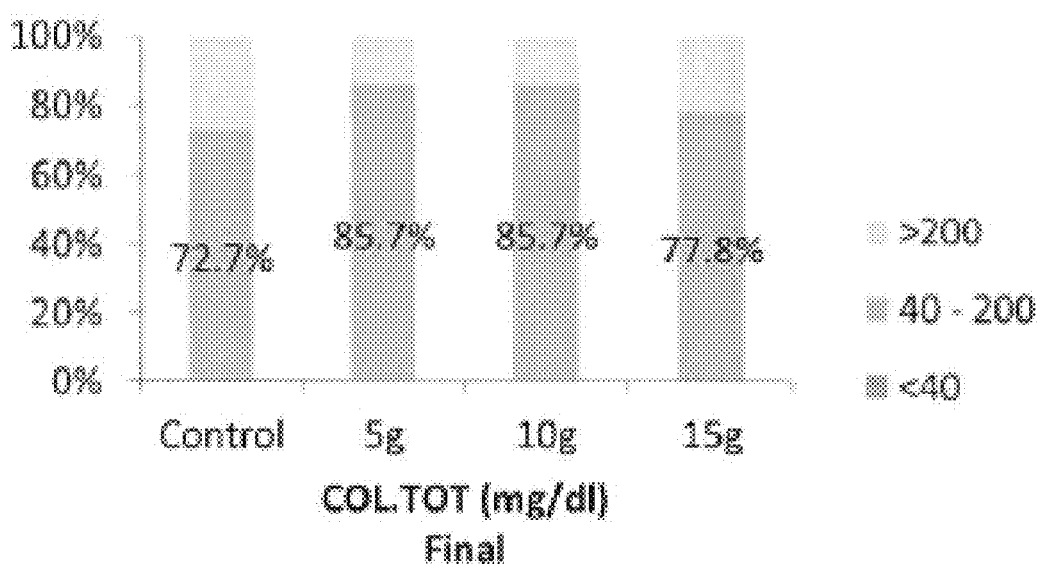

With regards to total cholesterol, approximately half of the participants in treatments 10 g and 15 g were in the normal range at the beginning of the study. By the end of the study, 86% and 78% of the participants in these two same treatments fell within the normal range for total cholesterol (FIG. 5).

Figure 6:
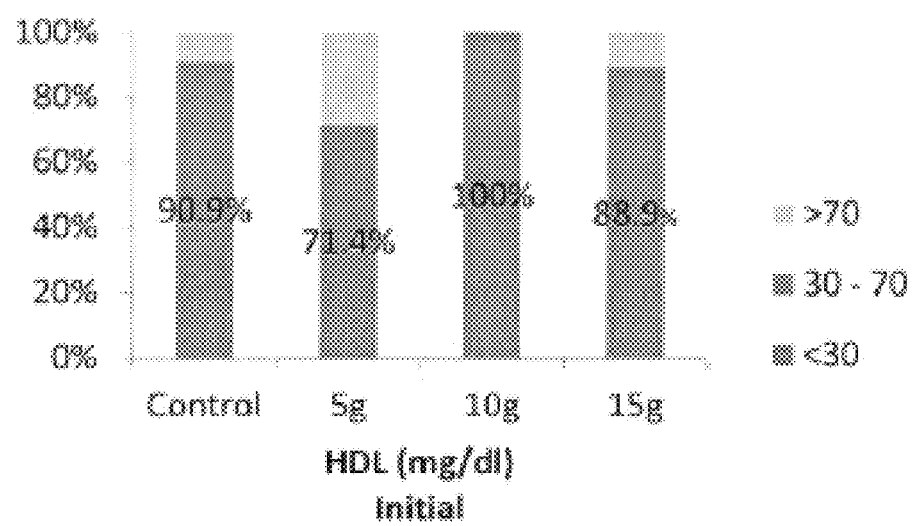
FIG. 6. Percentage of participants falling within the normal range (30-70 mg/dl) for high density lipoproteins (HDL) before and after the nutraceutical intervention in the 4 dose treatments of the nutraceutical for the G1 diabetic group.
Figure 6:
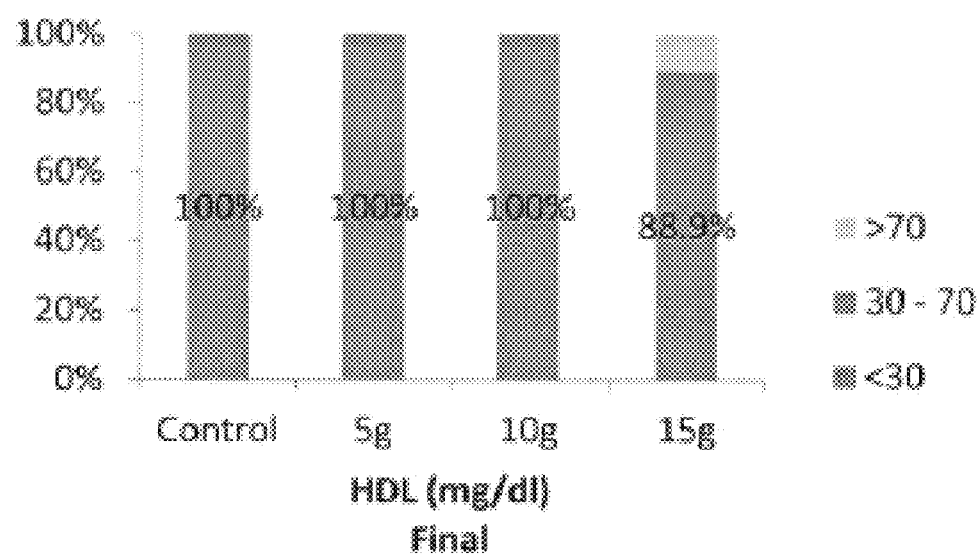

In the case of HDL, no substantial change was found between the initial and final percentages within the normal range but, as FIG. 6 shows, the majority of participants were already within normal range at the beginning of the study.

With regards to LDL many participants were also within normal range at the start of the trial, but whereas there was a slight decrease in the percentage of participants of the control group within normal values at the end of the study,

TABLE 20

Student t test results for comparison of "before and after" mean blood test results for 7 variables in each of the treatments of the G2 group of participants.

| Treatment | Variable | N | Mean Initial | Mean Final | Difference[1] | p-value | |
|---|---|---|---|---|---|---|---|
| 15 g | GLUC mg/dl | 7 | 263.89 | 178.84 | −32.20% | 0.0311 | * |
|  | HbA1c (%) | 7 | 9.41 | 7.94 | −15.60% | 0.0613 | NS |
|  | INSULIN (uUI/ml) | 7 | 0.92 | 13.32 | 1347.80% | 0.0189 | * |
|  | COL. TOT (mg/dl) | 7 | 207.73 | 202.41 | −2.60% | 0.7687 | NS |
|  | HDL (mg/dl) | 7 | 55.93 | 58.16 | 4.00% | 0.6412 | NS |
|  | LDL (mg/dl) | 7 | 104.06 | 106.21 | 2.10% | 0.7637 | NS |
|  | TRIG (mg/dl) | 7 | 240.83 | 222.46 | −7.60% | 0.7924 | NS |
| 10 g | GLUC mg/dl | 8 | 287.05 | 213.39 | −20.10% | 0.0831 | NS |
|  | HbA1c (%) | 8 | 9.45 | 8.7 | −7.90% | 0.1228 | NS |
|  | INSULIN (uUI/ml) | 8 | 2.22 | 8.23 | 270.70% | 0.0021 | * |
|  | COL. TOT (mg/dl) | 8 | 217.41 | 202.89 | −6.70% | 0.0602 | NS |
|  | HDL (mg/dl) | 8 | 58.25 | 54.18 | −7.00% | 0.1203 | NS |
|  | LDL (mg/dl) | 8 | 116.79 | 99.14 | −15.10% | 0.0413 | * |
|  | TRIG (mg/dl) | 8 | 212.16 | 247.24 | 16.50% | 0.3505 | NS |
| 5 g | GLUC mg/dl | 9 | 248.83 | 228.96 | −8.00% | 0.453 | NS |
|  | HbA1c (%) | 9 | 9.14 | 8.61 | −5.80% | 0.3836 | NS |
|  | INSULIN (uUI/ml) | 9 | 2 | 5.94 | 297.00% | 0.0224 | * |
|  | COL. TOT (mg/dl) | 9 | 191.97 | 184.32 | −4.00% | 0.4096 | NS |
|  | HDL (mg/dl) | 9 | 53.71 | 50.58 | −5.80% | 0.2882 | NS |
|  | LDL (mg/dl) | 9 | 97.37 | 95.09 | −2.30% | 0.7846 | NS |
|  | TRIG (mg/dl) | 9 | 226.89 | 238.22 | 5.00% | 0.5871 | NS |
| Control | GLUC mg/dl | 7 | 227.9 | 217.54 | −4.50% | 0.5703 | NS |
|  | HbA1c (%) | 7 | 8.62 | 8.33 | −3.40% | 0.384 | NS |
|  | INSULIN (uUI/ml) | 7 | 4.13 | 5.96 | 44.30% | 0.1552 | NS |
|  | COL. TOT (mg/dl) | 7 | 205.26 | 193.16 | −4.90% | 0.2796 | NS |
|  | HDL (mg/dl) | 7 | 56.89 | 55.86 | −1.80% | 0.3209 | NS |
|  | LDL (mg/dl) | 7 | 101.87 | 97.59 | −4.20% | 0.3324 | NS |
|  | TRIG (mg/dl) | 7 | 285.83 | 248.37 | −13.10% | 0.505 | NS |

5. Descriptive Analysis of "Before and After" Normal Range Values 5.1 Prediabetic Group G1

Figure 2:
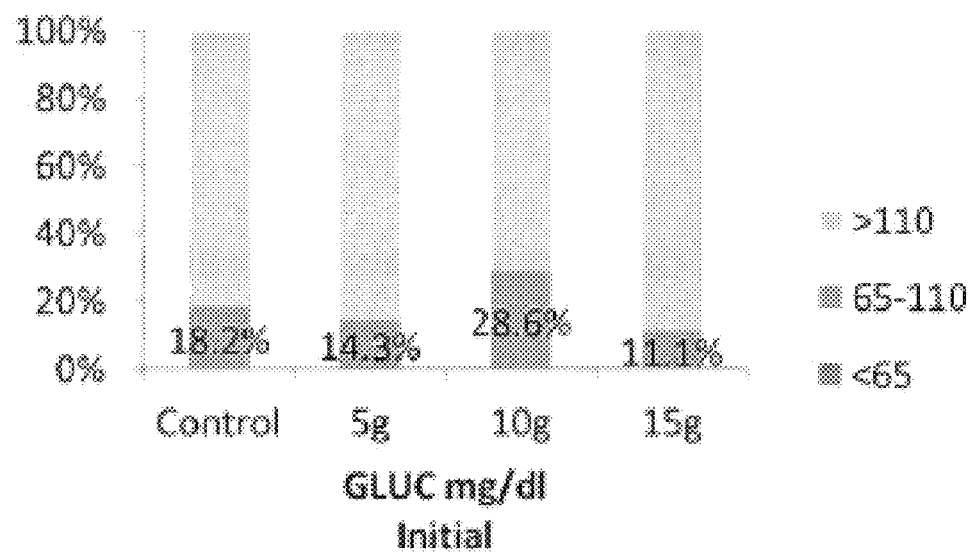
FIG. 2. Percentage of participants falling within normal glucose values before and after the nutraceutical intervention in the 4 dose treatments of the nutraceutical for the G1 diabetic group.
Figure 2:
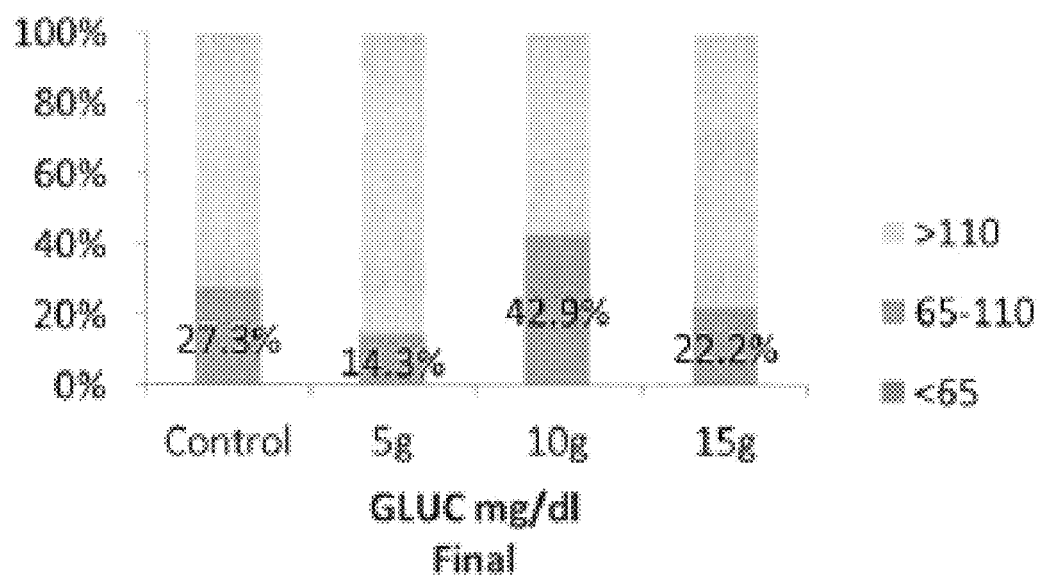

The analysis of percentage of participants within 'normal range values' for the 7 dependent is important from a clinical point of view. In the pre/mild/controlled diabetic group of participants not much of a change was seen in the percentage of participants falling within normal FG values before and after the nutraceutical intervention in any of the 4 dose treatments (FIGS. 2).

Figure 3:
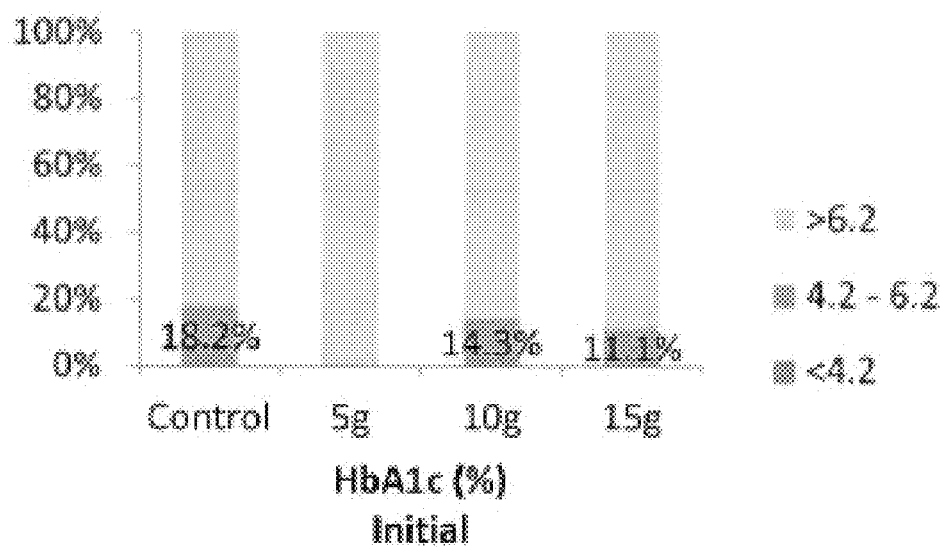
FIG. 3. Percentage of participants falling within normal HbA1c values (4.2%-6.2%) before and after the nutraceutical intervention in the 4 dose treatments of the nutraceutical for the G1 diabetic group.
Figure 3:
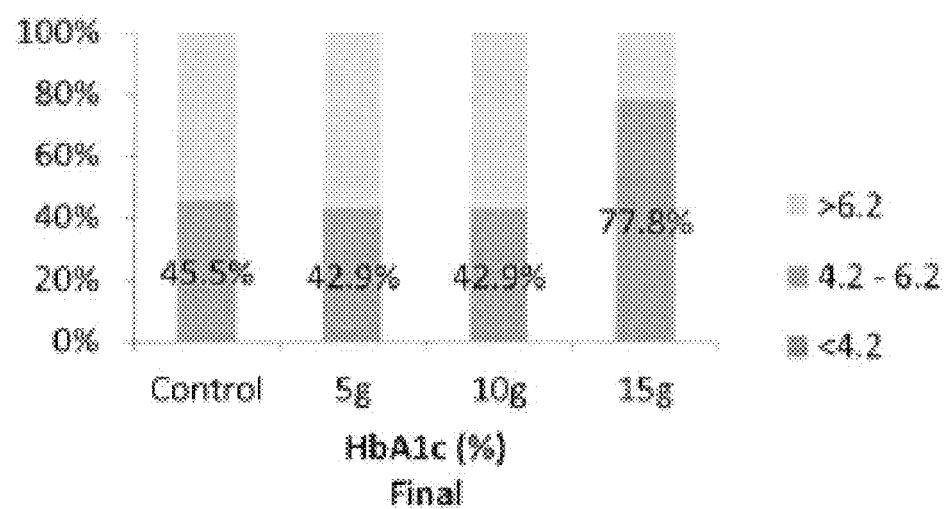

In contrast, a significant change was detected in the number of participants who fell in the normal range values for HbA1c at the end of the study, particularly in the 15 g treatment, as can be seen in FIG. 3.

Figure 4:
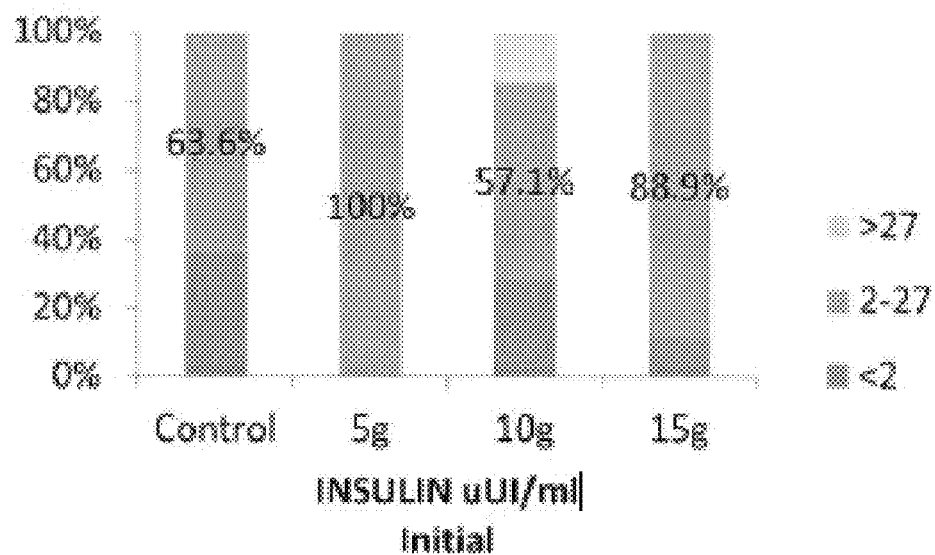
FIG. 4. Percentage of participants falling with in normal range for insulin values (2-27 µU/ml) before and after the nutraceutical intervention in the 4 dose treatments of the nutraceutical for the G1 diabetic group.
Figure 4:
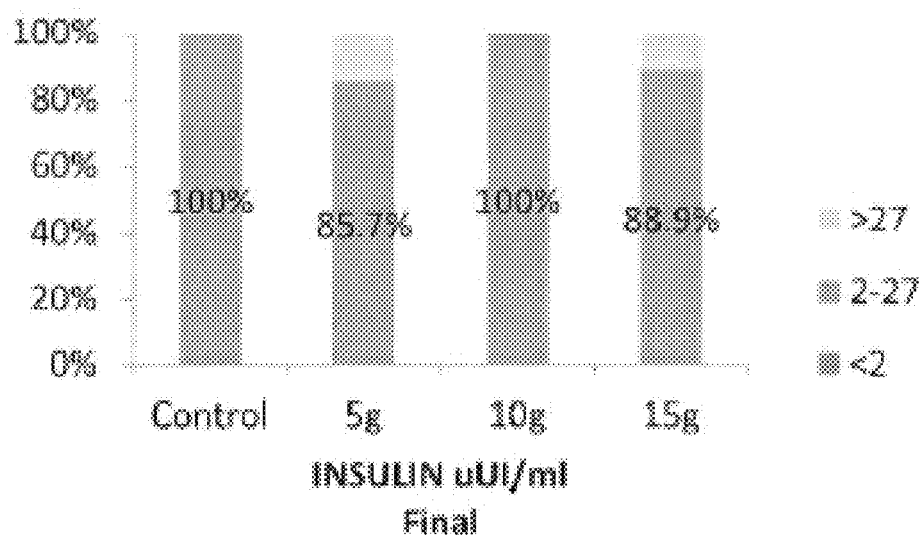
Figure 7:
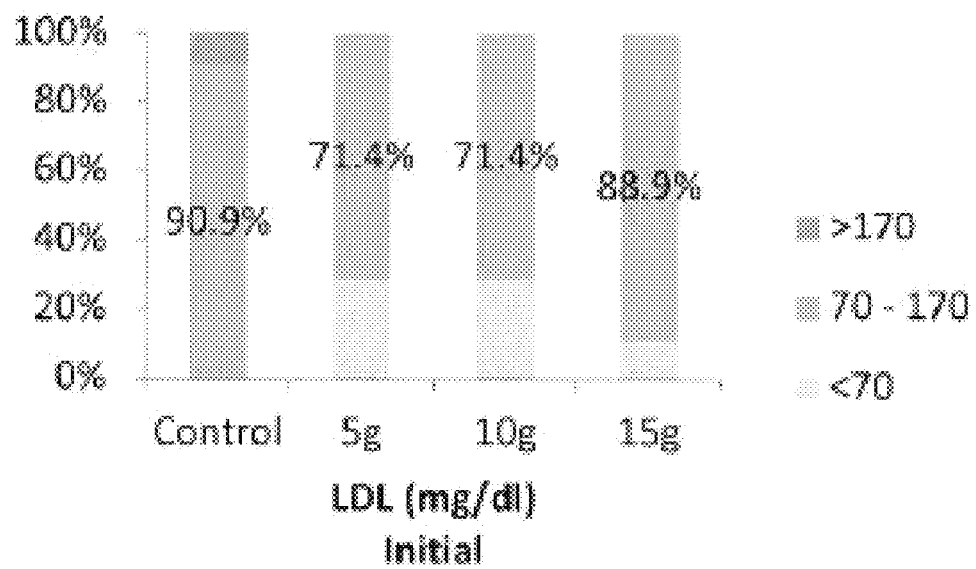
FIG. 7. Percentage of participants falling within the normal range (70-170 mg/dl) for low density lipoproteins (LDL) before and after the nutraceutical intervention in the 4 dose treatments of the nutraceutical for the G1 diabetic group.
Figure 7:
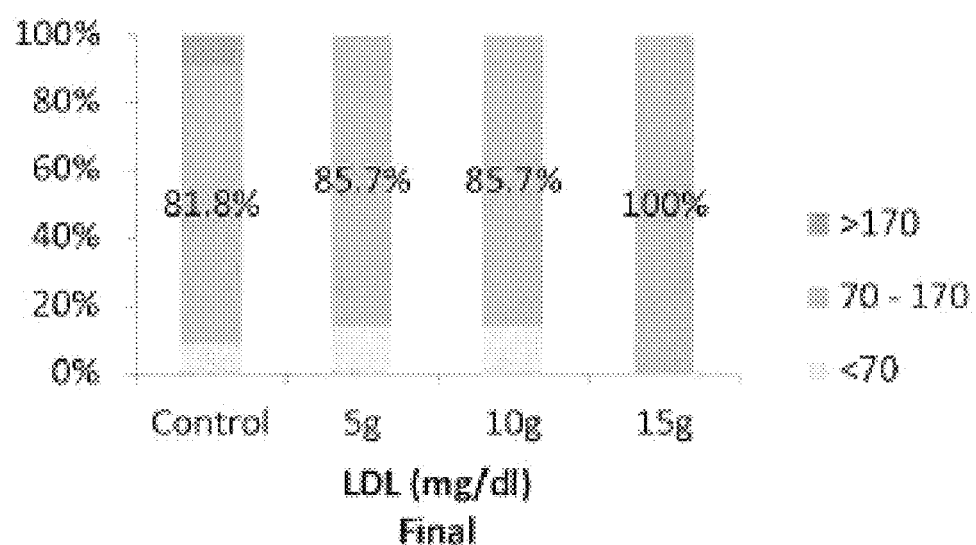

With regards to insulin, many of the G1 participants were already in the normal range at the beginning of the study. However in the treatment of 10 g all participants were within the normal range of insulin at the end of the study, compared to 57% initially (FIG. 4).

the three nutraceutical treatments showed a slight increase in the number of participants falling in the normal range at the same point in time (FIG. 7).

Figure 8:
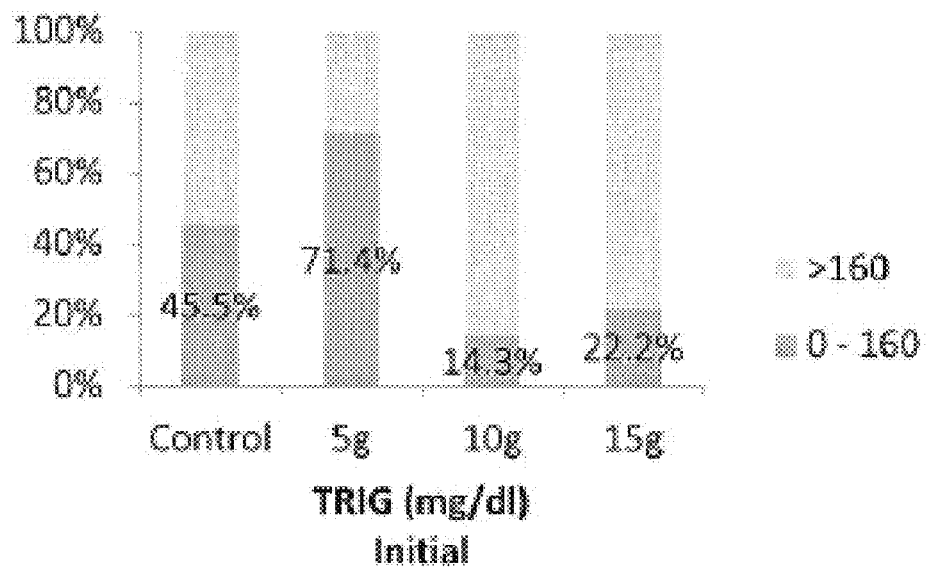
FIG. 8. Percentage of participants falling within the normal range (0-160 mg/dl) for triglycerides (TRIG) before and after the nutraceutical intervention in the 4 dose treatments of the nutraceutical for the G1 diabetic group.
Figure 8:
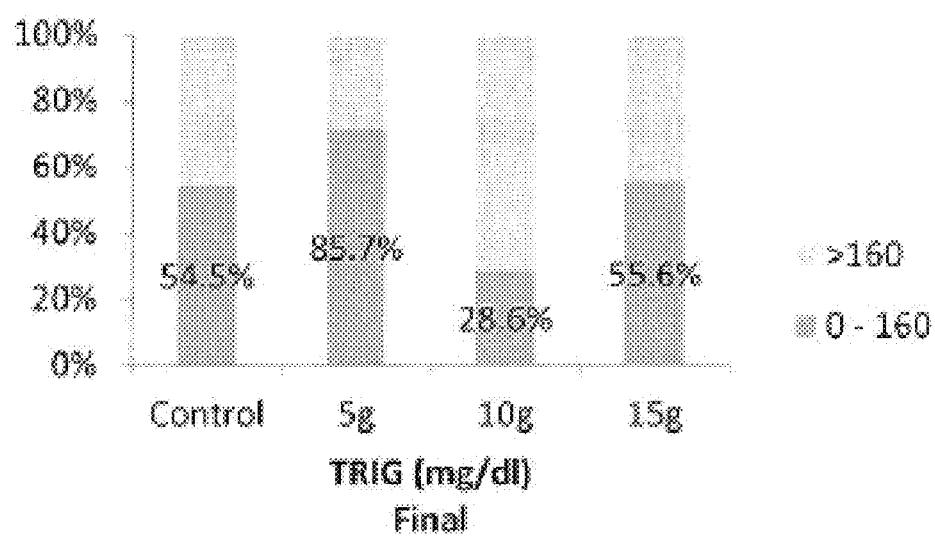

Finally, in the case of triglycerides (FIG. 8), increases in the number of participants falling within normal values were higher in all three nutraceutical treatments compared to the control. However the greatest increase was found in the 15 gram treatment, where the percentage of participants showing triglyceride values within normal ranges increased from 22.2% at the beginning of the study to 55.6% by the end of the trial, an increase of 150%.

Overall, the most substantial increases in the proportion of participants falling within normal range was observed in the variables HbA1c, LDL and triglycerides in the 15 gr dose of the nutraceutical, while insulin and glucose showed the most improvement in the 10 gr dose (Table 21).

TABLE 21

Percentage of change in the proportion of participants falling within normal range values at the end of the study in the pre-diabetic G1 group.
GROUP 1

| Treatment | Variable | Percentange of participants[1] |
|---|---|---|
| Control | GLUC (mg/dl) | 9.10% |
| | HbA1c (%) | 27.30% |
| | INSULIN (uUl/ml) | 36.40% |
| | COL. TOT (mg/dl) | 36.40% |
| | HDL (mg/dl) | 9.10% |
| | LDL (mg/dl) | −9.10% |
| | TRIG (mg/dl) | 9.10% |
| 5 g | GLUC (mg/dl) | 0.00% |
| | HbA1c (%) | 42.99% |
| | INSULIN (uUl/ml) | −14.30% |
| | COL. TOT (mg/dl) | 14.30% |
| | HDL (mg/dl) | 28.60% |
| | LDL (mg/dl) | 14.30% |
| | TRIG (mg/dl) | 0.00% |
| 10 g | GLUC (mg/dl) | 14.30% |
| | HbA1c (%) | 28.60% |
| | INSULIN (uUl/ml) | 42.90% |
| | COL. TOT (mg/dl) | 28.60% |
| | HDL (mg/dl) | 0.00% |
| | LDL (mg/dl) | 14.30% |
| | TRIG (mg/dl) | 14.30% |
| 15 g | GLUC (mg/dl) | 11.10% |
| | HbA1c (%) | 66.70% |
| | INSULIN (uUl/ml) | 0.00% |
| | COL. TOT (mg/dl) | 33.30% |
| | HDL (mg/dl) | 0.00% |
| | LDL (mg/dl) | 11.10% |
| | TRIG (mg/dl) | 33.30% |

[1]Percentange refers to the change (positive or negative) in the proportion of participants falling within normal range values by the end of the study.

Diabetic Group G2

Figure 9:
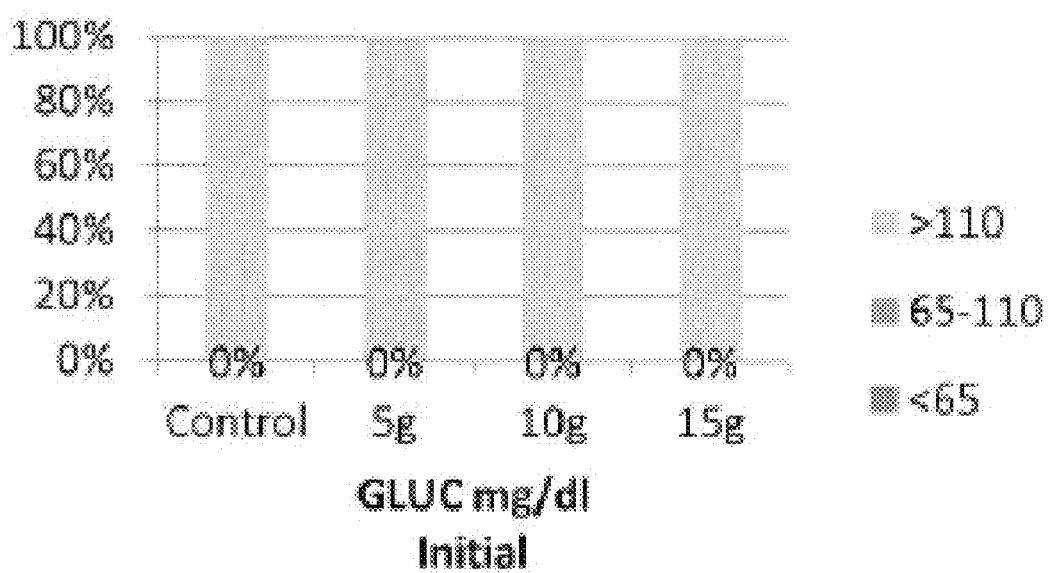
FIG. 9. Percentage of participants falling within normal glucose values before and after the nutraceutical intervention in the 4 dose treatments of the nutraceutical for the G2 diabetic group.
Figure 9:
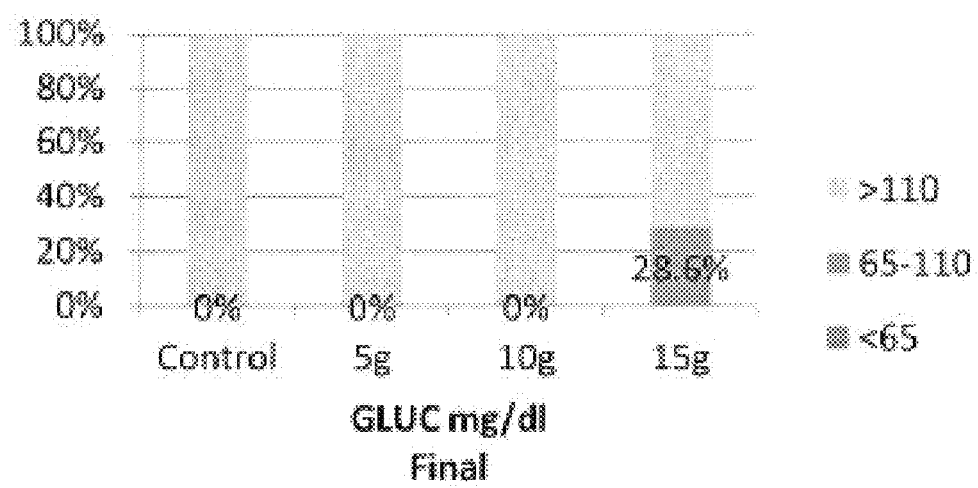

Diabetic group 2 showed no participants falling within normal range for FG values at the beginning of the study. However, by the end of the intervention window, 28.6% of the participants in the 15 g nutraceutical treatment showed normal values for glucose (FIG. 9).

Figure 10:
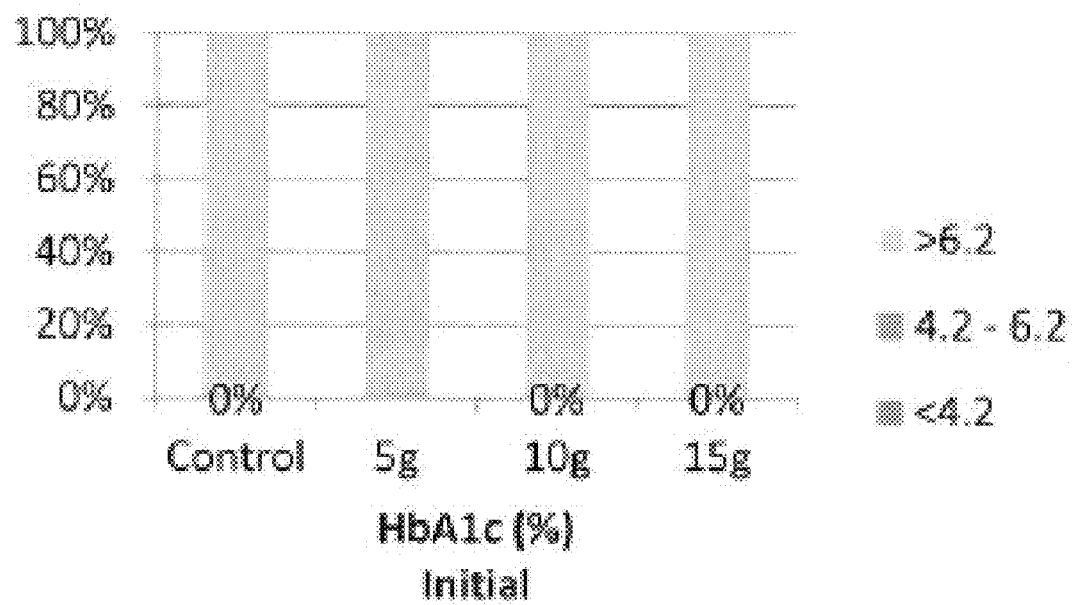
FIG. 10. Percentage of participants falling within normal HbA1c (4.2%-6.2%) values before and after the nutraceutical intervention in the 4 dose treatments of the nutraceutical for the G2 diabetic group.
Figure 10:
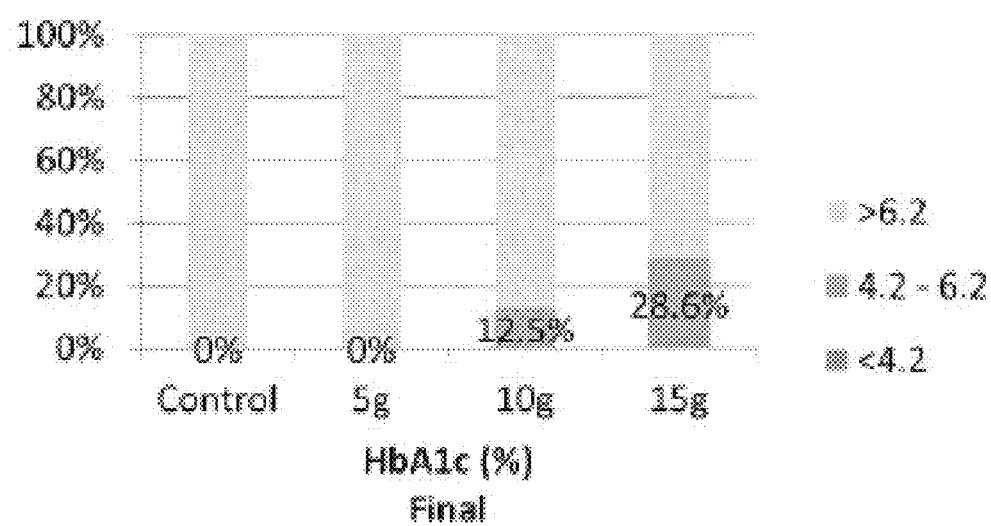

Similarly to FG, no participants fell with in normal values for HbA1C at the beginning of the study in the G2 group. By the end of the trial, 12.5% and 28.6% of participants exhibited normal glycosylated hemoglobin values in the 10 G and 15 g treatments, respectively (FIG. 10).

Figure 11:
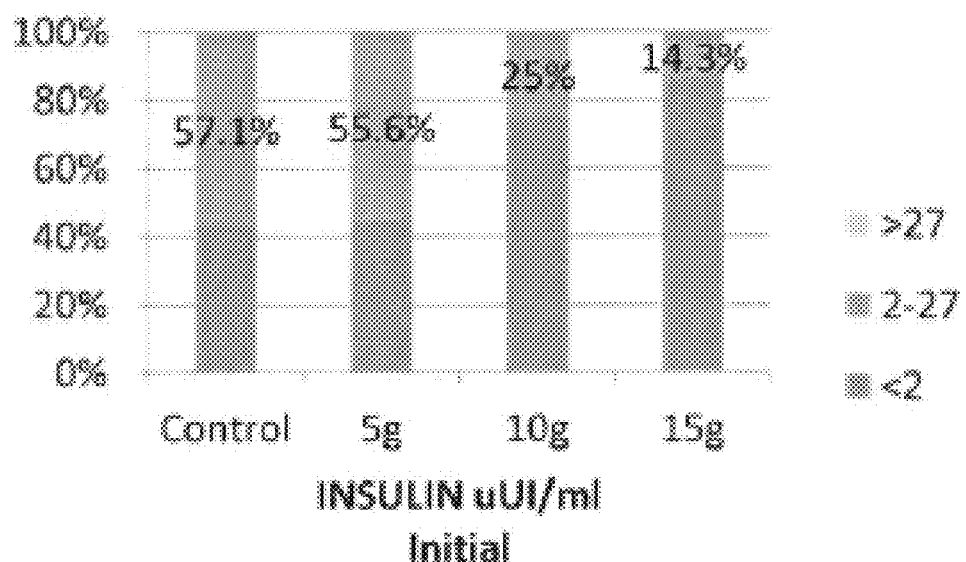
FIG. 11. Percentage of participants falling within normal insulin (2-27 µl U/ml) values before and after the nutraceutical intervention in the 4 dose treatments of the nutraceutical for the G2 diabetic group.
Figure 11:
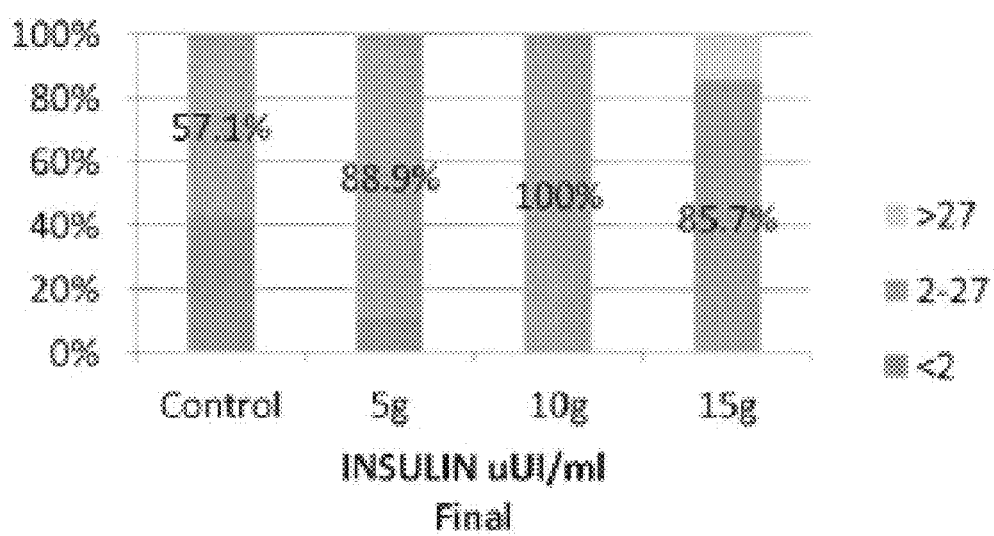

As can be seen in FIG. 11, the majority of participants fell below the normal insulin values at the beginning of the study. By the end of the 3 month nutraceutical period however, 88.9%, 100% and 85 .7% of participants were categorized within the normal insulin range in the 5 g, 10 g and 15 g nutraceutical treatments, respectively. In contrast, the proportion of participants within normal insulin values remained the same in the control group.

Figure 12:
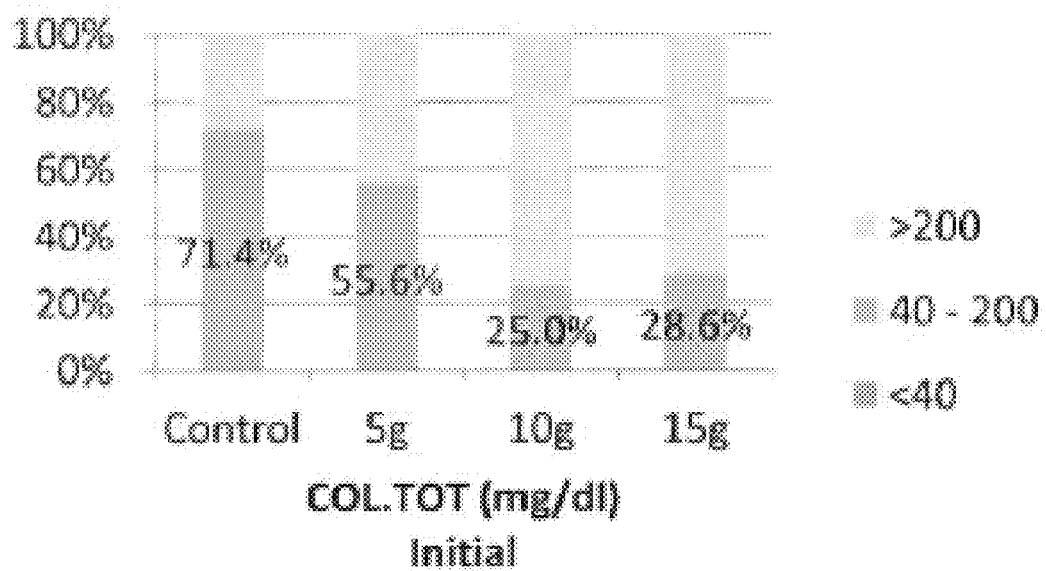
FIG. 12. Percentage of participants falling within normal of total cholesterol values (40-200 mg/dl) before and after the nutraceutical intervention in the 4 dose treatments of the nutraceutical for the G2 diabetic group.
Figure 12:
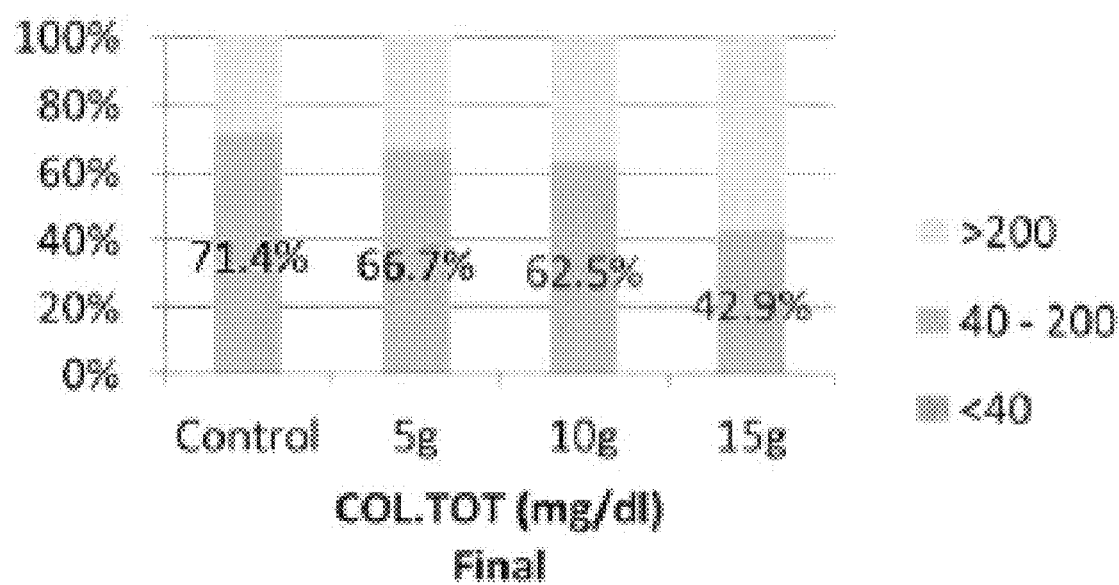

With regards to the variable total cholesterol (FIG. 12) control percentages remained unchanged at the end of the study, but the proportion of participants falling within the normal value range increased in all 3 nutraceutical groups with the greatest improvement seen in the 10 g and 15 g treatments.

Figure 13:
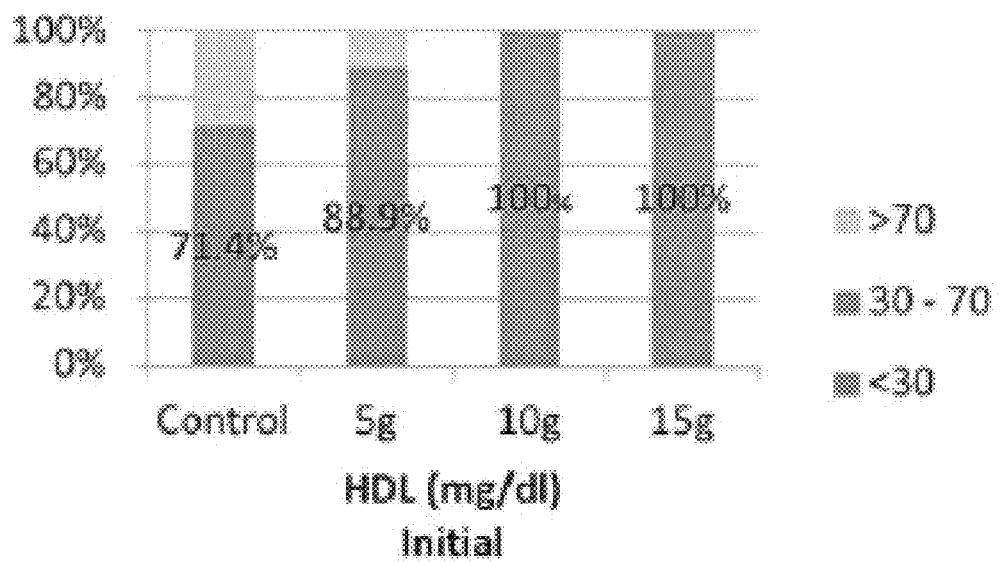
FIG. 13. Percentage of participants falling within the normal range (30-70 mg/dl) for high density lipoproteins (HDL) before and after the nutraceutical intervention in the 4 dose treatments of the nutraceutical for the G2 diabetic group.
Figure 13:
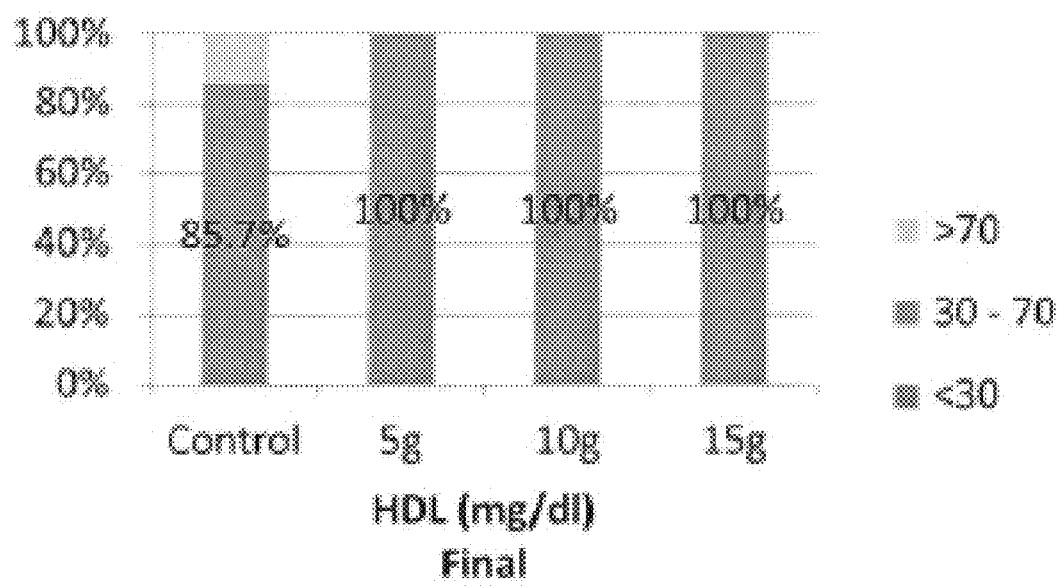
Figure 14:
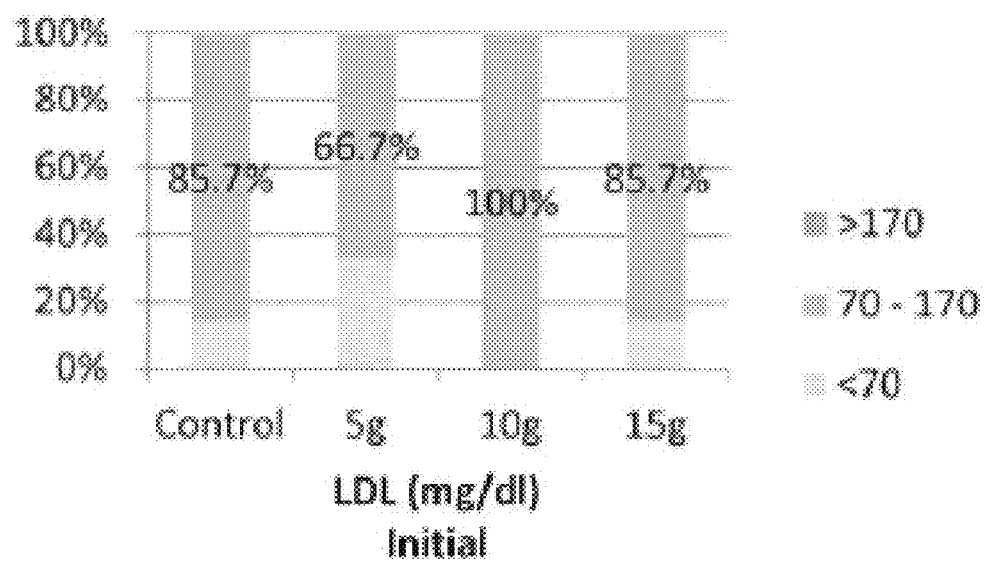
FIG. 14. Percentage of participants falling within the normal range (70-170 mg/dl) for low density lipoproteins (LDL) before and after the nutraceutical intervention in the 4 dose treatments of the nutraceutical for the G2 diabetic group.
Figure 14:
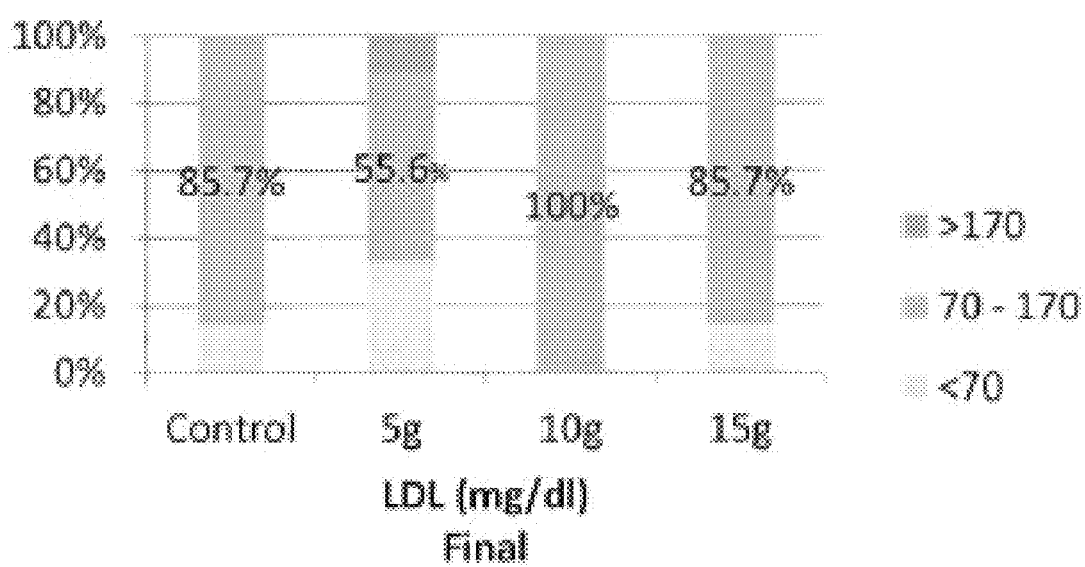
Figure 15:
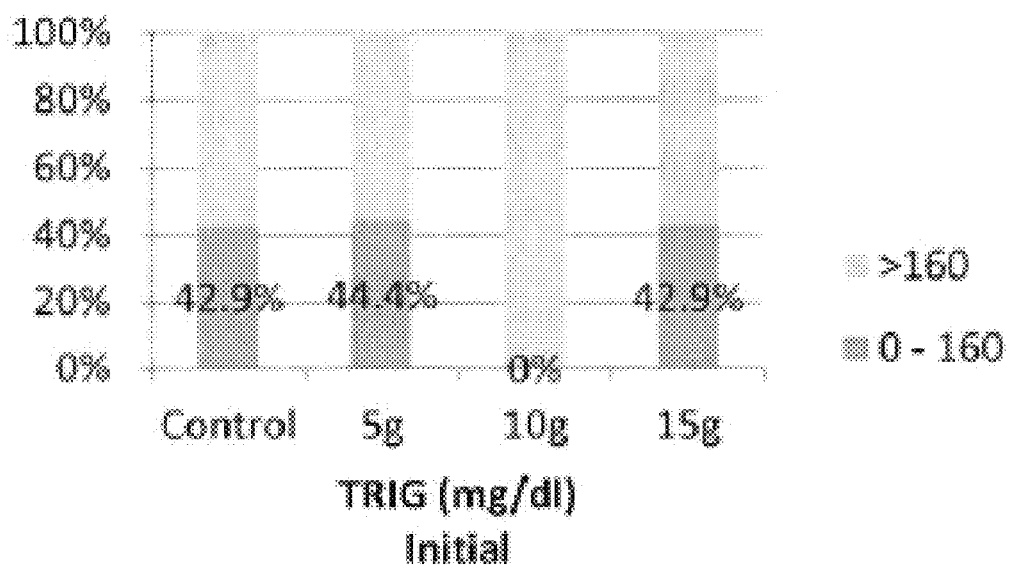
FIG. 15. Percentage of participants falling within the normal range (0-160 mg/dl) for triglycerides (TRIO) before and after the nutraceutical intervention in the 4 dose treatments of the nutraceutical for the G2 diabetic group.
Figure 15:
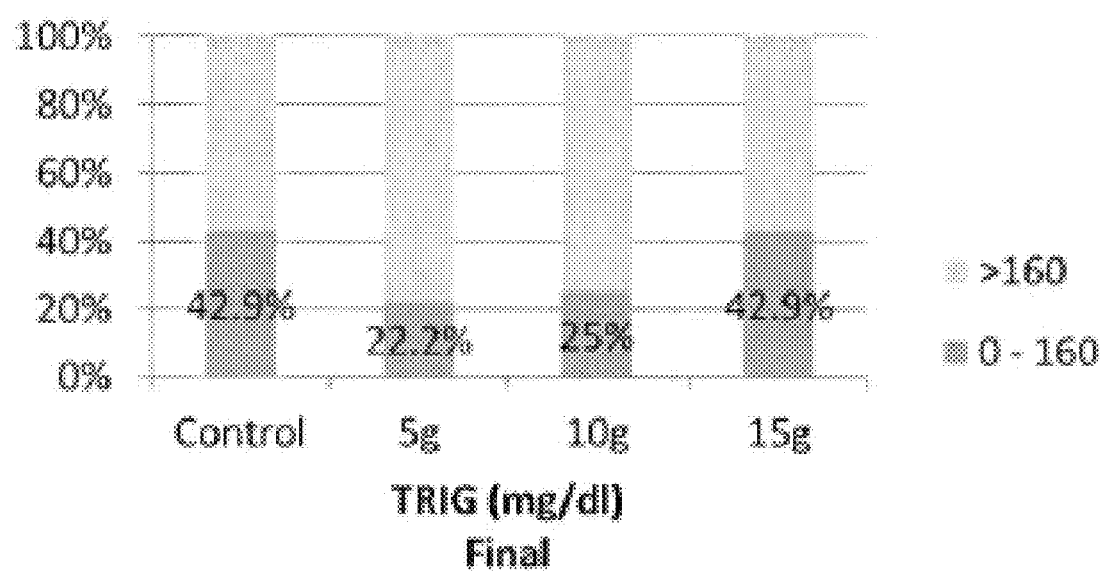

In the case of HDL, no substantial change was found between the initial and final percentages of participants with in the normal range. This can be explained by the fact that as FIG. 13 shows, the majority of participants were already within normal range at the beginning of the study. Similar results were obtained with LDL's (FIG. 14), while triglycerides remained basically unchanged at the end of the study (FIG. 15).

The most substantial change was observed in the variable insulin where the percentage of participants within normal range values increased in all three nutraceutical doses, while the control group remained unchanged at 0% (Table 22).

TABLE 22

Percentage of change in the proportion of participants falling within normal range values at the end of the study in the pre-diabetic G2 group.
GROUP 2

| Treatment | Variable | Percentange of participants[1] |
|---|---|---|
| Control | GLUC (mg/dl) | 0.00% |
| | HbA1c (%) | 0.00% |
| | INSULIN (uUl/ml) | 0.00% |
| | COL. TOT (mg/dl) | 0.00% |
| | HDL (mg/dl) | 14.30% |
| | LDL (mg/dl) | 0.00% |
| | TRIG (mg/dl) | 0.00% |
| 5 g | GLUC (mg/dl) | 0.00% |
| | HbA1c (%) | 0.00% |
| | INSULIN (uUl/ml) | 33.30% |
| | COL. TOT (mg/dl) | 11.10% |
| | HDL (mg/dl) | 11.10% |
| | LDL (mg/dl) | −11.10% |
| | TRIG (mg/dl) | −22.20% |
| 10 g | GLUC (mg/dl) | 0.00% |
| | HbA1c (%) | 12.50% |
| | INSULIN (uUl/ml) | 75.00% |
| | COL. TOT (mg/dl) | 37.50% |
| | HDL (mg/dl) | 0.00% |
| | LDL (mg/dl) | 0.00% |
| | TRIG (mg/dl) | 25.00% |
| 15 g | GLUC (mg/dl) | 28.60% |
| | HbA1c (%) | 28.60% |
| | INSULIN (uUl/ml) | 71.40% |
| | COL. TOT (mg/dl) | 14.30% |
| | HDL (mg/dl) | 0.00% |
| | LDL (mg/dl) | 0.00% |
| | TRIG (mg/dl) | 0.00% |

[1]Percentange refers to the change (positive or negative) in the proportion of participants falling within normal range values by the end of the study.

The demonstrative nutraceutical of Table 1 demonstrated a significant capacity for lowering the levels of all 3 diabetes-related blood parameters. In the pre-diabetic (also known as impaired glucose tolerance) or mild diabetes category, 10 g and 15 g twice daily of the nutraceutical significantly decreased fasting glucose and HbA1c compared to the control group (0 nutraceutical). In the longitudinal analysis, fasting serum insulin of the HbA1c >7.5% category was significantly greater in all nutraceutical treatments, compared to the control group.

Overall prediabetics or mild diabetics had a better response to the nutraceutical compared to participants with HbA1c ≥7.5%, with significant reductions in both glucose-related and lipid related blood variables. Significant reductions were found in Glucose, HbA1c, total cholesterol, and LDL in G1 participants taking the nutraceutical, compared to the participants in the control group.

Participants in the HbA1c ≥7.5% category, exhibited a significant increase in their fasting serum insulin level after base line insulin levels at the beginning of the trial showed deficient insulin production. By the end of the study, participants in the G2 group had not only significantly lowered their fasting glucose levels but their fasting serum insulin concentration had significantly increased, in a dose-responsive fashion, evidence of increased biosynthesis. Participants in G1 group did not have a significant fastinG1nsulin increase, however their fastinG1nsulin levels were within normal range at all times during the clinical trial.

As disclosed herein, nutraceutical prepared in accordance with this disclosure, and summarized in Table 1, were provided twice daily (e.g., the 5 g dose is equivalent to 10 daily grams of the nutraceutical, the 10 g treatment was equivalent to 20 daily grams, and the 15 g dose was equivalent to 30 daily grams of nutraceutical). Table 23 below shows the mean diabetes-related blood chemistry results between after 90 days of consumption of the example nutraceutical described in Table 1.

TABLE 23

| Treatment | FASTING GLUCOSE mg/dl | | | HbA1c(%) | Difference with control | | FASTING INSULIN uUI/ml | | |
|---|---|---|---|---|---|---|---|---|---|
| | average | Difference with control mg/dl | % | average | Percent points | % | average | Difference with control uIU/ml | % |
| GROUP 1 (HbA1c ≥6.1% & <7.5) | | | | | | | | | |
| Control | 165.27 | | | 7.03 | | | 8.67 | | |
| 5 gr | 145.41 | −19.86 | −12.02 | 6.56 | −0.47 | −6.69 | 6.44 | −2.23 | −25.72 |
| 10 gr | *129.67* | −35.60 | *−21.54* | 6.27 | −0.76 | *−10.81* | 9.16 | 0.49 | 5.65 |
| 15 gr | *127.10* | −38.17 | *−23.10* | 5.97 | −1.06 | *−15.08* | 12.17 | 3.50 | 40.37 |
| GROUP 2 (HbA1c ≥7.5) | | | | | | | | | |
| Control | 217.54 | | | 8.33 | | | 5.69 | | |
| 5 gr | 228.96 | 11.42 | | 8.61 | 0.28 | | 5.94 | 0.25 | 4.39 |
| 10 gr | 213.39 | −4.15 | −1.91 | 8.70 | 0.37 | 4.44 | 8.23 | 2.29 | 44.64 |
| 15 gr | 178.84 | −38.70 | −17.79 | 7.94 | −0.39 | −4.68 | 13.32 | 7.63 | 123.49 |

Values in italics are statistically significant (p < 0.05) from values obtained in the control treatment.

Table 24 below shows the longitudinal comparison of the before (0 days) and after (90 days) diabetes-related blood chemistry results at finalization of the nutraceutical consumption period.

TABLE 24

| Treatment | FASTING GLUCOSE mg/dl | | | HbA1c(%) | Difference with control | | FASTING INSULIN uUI/ml | | |
|---|---|---|---|---|---|---|---|---|---|
| | average | Difference with control mg/dl | % | average | Percent points | % | average | Difference with control uIU/ml | % |
| GROUP 1 (HbA1c ≥6.1% & ≤7.5) | | | | | | | | | |
| Control | | | | | | | | | |
| 0 days | 142.49 | | | 6.68 | | | 5.99 | | |
| 90 days | 165.27 | 22.78 | 15.99 | 7.03 | 0.35 | 5.24 | 8.67 | 2.68 | 44.74 |
| 5 grams | | | | | | | | | |
| 0 days | 143.86 | | | 6.80 | | | 7.70 | | |
| 90 days | 145.41 | 1.55 | 1.08 | 6.56 | −0.24 | −3.53 | 6.44 | −1.26 | −16.36 |
| 10 grams | | | | | | | | | |
| 0 days | 126.96 | | | 6.60 | | | 8.35 | | |
| 90 days | 129.67 | 2.71 | 2.13 | 6.27 | −0.33 | −5.00 | 9.16 | 0.81 | 9.70 |
| 15 grams | | | | | | | | | |
| 0 days | 1.34 | | | 6.74 | | | 8.13 | | |
| 90 days | 127.1 | −7.70 | −5.71 | 5.97 | −0.77 | *−11.42* | 12.17 | 3.86 | 46.45 |
| GROUP 2 (HbA1c > 7.5) | | | | | | | | | |
| Control | | | | | | | | | |
| 0 days | 227.9 | | | 8.62 | | | 4.13 | | |
| 90 days | 217.54 | −10.36 | −4.55 | 8.33 | −0.29 | −3.36 | 5.96 | 1.83 | 44.31 |

TABLE 24-continued

| | FASTING GLUCOSE mg/dl | | | HbA1c(%) | | | FASTING INSULIN uUI/ml | | |
|---|---|---|---|---|---|---|---|---|---|
| | | Difference with control | | | Difference with control | | | Difference with control | |
| Treatment | average | mg/dl | % | average | Percent points | % | average | uIU/ml | % |
| 5 grams | | | | | | | | | |
| 0 days | 248.82 | | | 9.14 | | | 2.00 | | |
| 90 days | 228.96 | −19.86 | −7.98 | 8.61 | −0.53 | −5.80 | *5.94* | *3.94* | *197.00* |
| 10 grams | | | | | | | | | |
| 0 days | 267.05 | | | 9.45 | | | 2.22 | | |
| 90 days | 213.39 | −53.66 | −20.09 | 8.70 | −0.75 | −7.94 | *8.23* | *6.01* | *270.72* |
| 15 grams | | | | | | | | | |
| 0 days | 263.89 | | | 9.41 | | | 0.92 | | |
| 90 days | *178.84* | *−85.05* | *−32.23* | 7.94 | −1.47 | −15.62 | *13.32* | *12.40* | *1347.83* |

Values in italics are statistically significant (p < 0.05) from values obtained in the control treatment.

Clearly, the nutraceuticals disclosed herein are an effective tool for management of blood glucose as part of a comprehensive integrated strategy for diabetes management, particularly for those affected by impaired glucose tolerance (pre-diabetes).

The invention claimed is:

1. A method of managing chronic health conditions related to type II diabetes, said method comprising the administration of a stabilized rice bran extract nutraceutical in an amount sufficient to decrease HbA1c blood concentrations in type II diabetic patients having an HbA1c blood concentration of 7.5% by 0.2% to 2.0%, said stabilized rice bran extract nutraceutical comprising a hydrophilic soluble fraction/lipophilic fiber fraction ratio of about 1.0 to about 1.5, and wherein at least 10 g of said nutraceutical is administered twice daily for at least 90 days.

* * * * *